(12) United States Patent
Hatano et al.

(10) Patent No.: US 9,262,165 B2
(45) Date of Patent: Feb. 16, 2016

(54) VECTOR PROCESSOR AND VECTOR PROCESSOR PROCESSING METHOD

(71) Applicant: FUJITSU SEMICONDUCTOR LIMITED, Yokohama-shi, Kanagawa (JP)

(72) Inventors: Hiroshi Hatano, Kawasaki (JP); Koichi Suzuki, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 560 days.

(21) Appl. No.: 13/733,524

(22) Filed: Jan. 3, 2013

(65) Prior Publication Data
US 2013/0246745 A1   Sep. 19, 2013

(30) Foreign Application Priority Data

Feb. 23, 2012 (JP) .................................. 2012-037825

(51) Int. Cl.
*G06F 15/00* (2006.01)
*G06F 13/00* (2006.01)
*G06F 9/30* (2006.01)
*G06F 9/38* (2006.01)

(52) U.S. Cl.
CPC .......... *G06F 9/30149* (2013.01); *G06F 9/3017* (2013.01); *G06F 9/30036* (2013.01); *G06F 9/30109* (2013.01); *G06F 9/30112* (2013.01); *G06F 9/3836* (2013.01); *G06F 9/3873* (2013.01); *G06F 9/3887* (2013.01)

(58) Field of Classification Search
None
See application file for complete search history.

(56) References Cited

U.S. PATENT DOCUMENTS

| | | | | |
|---|---|---|---|---|
| 5,396,634 A | * | 3/1995 | Zaidi | .................. G06F 9/30145 712/209 |
| 6,349,379 B2 | * | 2/2002 | Gibson | ......................... 712/210 |
| 2001/0018735 A1 | * | 8/2001 | Murakami | ............ G06F 9/3814 712/207 |
| 2008/0313438 A1 | * | 12/2008 | Luick | ..................... G06F 9/382 712/222 |

FOREIGN PATENT DOCUMENTS

| | | |
|---|---|---|
| JP | 01-224872 | 9/1989 |
| JP | 2009-193378 A | 8/2009 |

* cited by examiner

*Primary Examiner* — Michael Sun
(74) *Attorney, Agent, or Firm* — Arent Fox LLP

(57) ABSTRACT

A vector processor includes an instruction fetching unit configured to acquire an instruction, a decoding/issuing unit configured to decode the instruction and issuing the instruction, an operation group configured to include a plurality of operation units and a register configured to store the element data column, wherein the plurality of operation units include a first operation unit processes a first type instruction and a second operation unit processes a second type instruction and the first type instruction; and when a plurality of divided instructions, for which the element data of an instruction to be issued has been divided, are processed by the second operation unit, in a case where the second type instruction is not present, the decoding/issuing unit issues the divided instructions, and in a case where the second type instruction is present, the decoding/issuing unit issues the instruction to be issued without performing division.

6 Claims, 16 Drawing Sheets

FIG.5A

| VL | vr1 | | vr2 | | vr0 | |
|---|---|---|---|---|---|---|
| 1 | VR32 | + | VR64 | = | VR0 | α |
| 2 | VR33 | + | VR65 | = | VR1 | |
| 3 | VR34 | + | VR66 | = | VR2 | |
| 4 | VR35 | + | VR67 | = | VR3 | |
| 5 | VR36 | + | VR68 | = | VR4 | |
| 6 | VR37 | + | VR69 | = | VR5 | |
| 7 | VR38 | + | VR70 | = | VR6 | 1Cy |
| 8 | VR39 | + | VR71 | = | VR7 | |
| 9 | VR40 | + | VR72 | = | VR8 | |
| 10 | VR41 | + | VR73 | = | VR9 | |
| 11 | VR42 | + | VR74 | = | VR10 | |
| 12 | VR43 | + | VR75 | = | VR11 | |
| 13 | VR44 | + | VR76 | = | VR12 | |
| 14 | VR45 | + | VR77 | = | VR13 | 2Cy |
| 15 | VR46 | + | VR78 | = | VR14 | |
| 16 | VR47 | + | VR79 | = | VR15 | |
| 17 | VR48 | + | VR80 | = | VR16 | |
| 18 | VR49 | + | VR81 | = | VR17 | |
| 19 | VR50 | + | VR82 | = | VR18 | |
| 20 | VR51 | + | VR83 | = | VR19 | |
| 21 | VR52 | + | VR84 | = | VR20 | |
| 22 | VR53 | + | VR85 | = | VR21 | |
| 23 | VR54 | + | VR86 | = | VR22 | 3Cy |
| 24 | VR55 | + | VR87 | = | VR23 | |
| 25 | VR56 | + | VR88 | = | VR24 | |
| 26 | VR57 | + | VR89 | = | VR25 | |
| 27 | VR58 | + | VR90 | = | VR26 | |
| 28 | VR59 | + | VR91 | = | VR27 | |
| 29 | VR60 | + | VR92 | = | VR28 | |
| 30 | VR61 | + | VR93 | = | VR29 | 4Cy |
| 31 | VR62 | + | VR94 | = | VR30 | |
| 32 | VR63 | + | VR95 | = | VR31 | |

FIG.5B

| Cycle | vr1 | | vr2 | | vr0 |
|---|---|---|---|---|---|
| 1 | VR32-VR39 | + | VR64-VR71 | = | VR0-VR7 |
| 2 | VR40-VR47 | + | VR72-VR79 | = | VR8-VR15 |
| 3 | VR48-VR55 | + | VR80-VR87 | = | VR16-VR23 |
| 4 | VR56-VR63 | + | VR88-VR95 | = | VR24-VR31 |

FIG.6A

| VL | vr2 | | vr4 | | vr0 | |
|---|---|---|---|---|---|---|
| 1 | VR64 VR65 | + | VR128 VR129 | = | VR0 VR1 | α ⎫ |
| 2 | VR66 VR67 | + | VR130 VR131 | = | VR2 VR3 | ⎬ 1Cy |
| 3 | VR68 VR69 | + | VR132 VR133 | = | VR4 VR5 | |
| 4 | VR70 VR71 | + | VR134 VR135 | = | VR6 VR7 | ⎭ |
| 5 | VR72 VR73 | + | VR136 VR137 | = | VR8 VR9 | ⎫ |
| 6 | VR74 VR75 | + | VR138 VR139 | = | VR10 VR11 | ⎬ 2Cy |
| 7 | VR76 VR77 | + | VR140 VR141 | = | VR12 VR13 | |
| 8 | VR78 VR79 | + | VR142 VR143 | = | VR14 VR15 | ⎭ |
| 9 | VR80 VR81 | + | VR144 VR145 | = | VR16 VR17 | ⎫ |
| 10 | VR82 VR83 | + | VR146 VR147 | = | VR18 VR19 | ⎬ 3Cy |
| 11 | VR84 VR85 | + | VR148 VR149 | = | VR20 VR21 | |
| 12 | VR86 VR87 | + | VR150 VR151 | = | VR22 VR23 | ⎭ |
| 13 | VR88 VR89 | + | VR152 VR153 | = | VR24 VR25 | ⎫ |
| 14 | VR90 VR91 | + | VR154 VR155 | = | VR26 VR27 | ⎬ 4Cy |
| 15 | VR92 VR93 | + | VR156 VR157 | = | VR28 VR29 | |
| 16 | VR94 VR95 | + | VR158 VR159 | = | VR30 VR31 | ⎭ |
| 17 | VR96 VR97 | + | VR160 VR161 | = | VR32 VR33 | ⎫ |
| 18 | VR98 VR99 | + | VR162 VR163 | = | VR34 VR35 | ⎬ 5Cy |
| 19 | VR100 VR101 | + | VR164 VR165 | = | VR36 VR37 | |
| 20 | VR102 VR103 | + | VR166 VR167 | = | VR38 VR39 | ⎭ |
| 21 | VR104 VR105 | + | VR168 VR169 | = | VR40 VR41 | ⎫ |
| 22 | VR106 VR107 | + | VR170 VR171 | = | VR42 VR43 | ⎬ 6Cy |
| 23 | VR108 VR109 | + | VR172 VR173 | = | VR44 VR45 | |
| 24 | VR110 VR111 | + | VR174 VR175 | = | VR46 VR47 | ⎭ |
| 25 | VR112 VR113 | + | VR176 VR177 | = | VR48 VR49 | ⎫ |
| 26 | VR114 VR115 | + | VR178 VR179 | = | VR50 VR51 | ⎬ 7Cy |
| 27 | VR116 VR117 | + | VR180 VR181 | = | VR52 VR53 | |
| 28 | VR118 VR119 | + | VR182 VR183 | = | VR54 VR55 | ⎭ |
| 29 | VR120 VR121 | + | VR184 VR185 | = | VR56 VR57 | ⎫ |
| 30 | VR122 VR123 | + | VR186 VR187 | = | VR58 VR59 | ⎬ 8Cy |
| 31 | VR124 VR125 | + | VR188 VR189 | = | VR60 VR61 | |
| 32 | VR126 VR127 | + | VR190 VR191 | = | VR62 VR63 | ⎭ |

FIG.6B

| Cycle | vr2 | | vr4 | | vr0 |
|---|---|---|---|---|---|
| 1 | VR64-VR71 | + | VR128-VR135 | = | VR0-VR7 |
| 2 | VR72-VR79 | + | VR136-VR143 | = | VR8-VR15 |
| 3 | VR80-VR87 | + | VR144-VR151 | = | VR16-VR23 |
| 4 | VR88-VR95 | + | VR152-VR159 | = | VR24-VR31 |
| 5 | VR96-VR103 | + | VR160-VR167 | = | VR32-VR39 |
| 6 | VR104-VR111 | + | VR168-VR175 | = | VR40-VR47 |
| 7 | VR112-VR119 | + | VR176-VR183 | = | VR48-VR55 |
| 8 | VR120-VR127 | + | VR184-VR191 | = | VR56-VR63 |

FIG.8
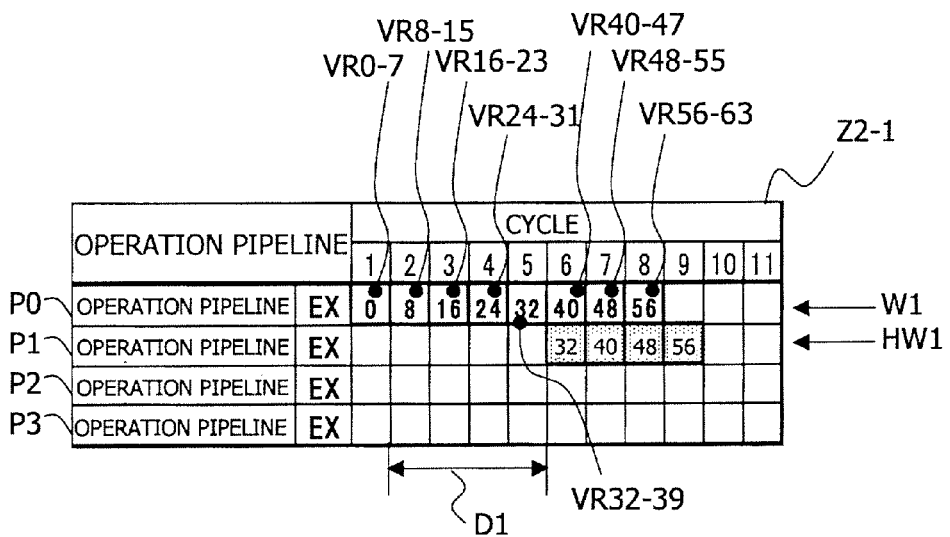
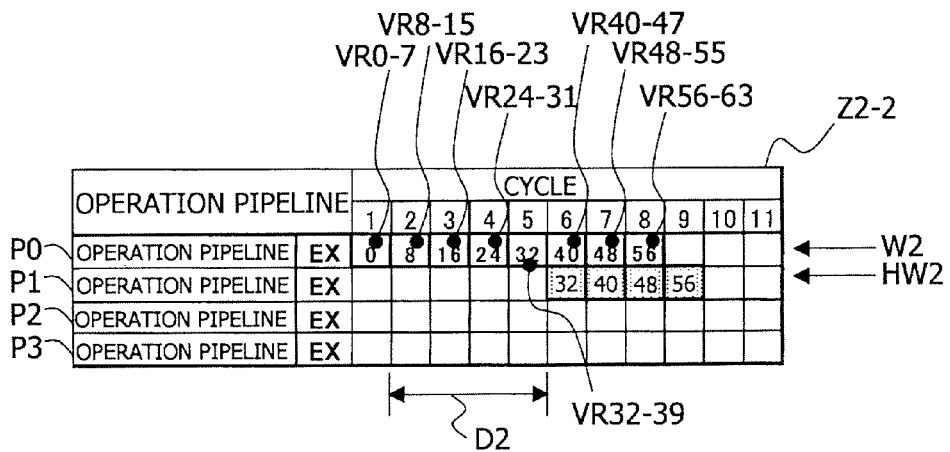

| OPERATION PIPELINE | | 1 | 2 | 3 | 4 | 5 | 6 | 7 | 8 | 9 | 10 | 11 |
|---|---|---|---|---|---|---|---|---|---|---|---|---|
| P0 | EX | 1 | 1 | 1 | 1 | | | | | | | |
| P1 | EX | | 2 | 2 | 2 | 2 | | | | 5 | 5 | 5 |
| P2 | EX | | | 3 | 3 | 3 | 3 | | | | 6 | 6 |
| P3 | EX | | | | 3 | 3 | 3 | 3 | 4 | 4 | 4 | 4 |

CYCLE

D5

Z4-2

| OPERATION PIPELINE | | 1 | 2 | 3 | 4 | 5 | 6 | 7 | 8 | 9 | 10 | 11 |
|---|---|---|---|---|---|---|---|---|---|---|---|---|
| P0 | EX | 1 | 1 | 1 | 1 | | | | | | | |
| P1 | EX | | 2 | 2 | 2 | 2 | | | 5 | 5 | 5 | 5 |
| P2 | EX | | | 3 | 3 | 3 | 3 | 3 | 3 | 6 | 6 | 6 |
| P3 | EX | | | | 3 | 4 | 4 | 4 | | | 3 | |

CYCLE

VECTOR PROCESSOR AND VECTOR PROCESSOR PROCESSING METHOD

CROSS-REFERENCE TO RELATED APPLICATION

This application is based upon and claims the benefit of priority of the prior Japanese Patent Application No. 2012-037825, filed on Feb. 23, 2012, the entire contents of which are incorporated herein by reference.

FIELD

Embodiments discussed herein relates to a vector processor and to a vector processor processing method.

BACKGROUND

A vector processor is used for vector processing in which a constant operation is repeated on a large quantity of element data forming an array. By means of a vector processor, element data of an array can be processed continuously using a single instruction, and high operation throughput can be obtained.

A vector processor has for example load/store and operation pipelines. An operation pipeline performs a single operation instruction fetch and decoding, sequentially and continuously reads out element data from a register (hereafter called a vector register), and executes arithmetic operation or other operation. The operation pipeline stores element data indicating the operation result in a vector register in the order of processing.

In a vector processor, operation instructions are processed for element data with different bit widths (for example, 8 bits, 16 bits, 32 bits, 64 bits, or similar). In general, an operation pipeline has a plurality of operation units each of which perform prescribed bit operations, and performs operation processing for a plurality of arrays in one cycle. Hence when the bit widths of element data differ depending on the operation instruction, the number of arrays of element data processed in one cycle also differ depending on the operation instruction. In a vector processor, the number of arrays of element data for each instruction is set to be the same, and so when the bit widths of element data are different depending on the operation instruction, the number of processing cycles for the operation instruction differs with the operation instruction. For example, under prescribed conditions, a half-word instruction with a bit width of 16 bits requires four cycles, whereas a full-word instruction with a bit width of 32 bits requires eight cycles.

In this way, when processing operation instructions for element data with different bit widths, delays in issuing subsequent operation instructions may occur. For example, subsequent to a preceding full-word instruction (for example, eight cycles), a half-word instruction (for example, four cycles) may be processed. Further, at this time the subsequent half-word instruction is assumed to process element data which is processed in the latter-half four cycles among the element data processed by the preceding full-word instruction.

At this time, in the cycle immediately after the preceding full-word instruction is issued, when the subsequent half-word instruction is issued, in the preceding full-word operation instruction, processing of the element data which is to be processed in the subsequent half-word instruction is not ended. Hence the vector processor waits for the end of processing of the element data, and issues the subsequent half-word instruction. As a result the issuing of the subsequent half-word instruction is delayed, and operation throughput falls.

Hence when a vector processor has a plurality of operation pipelines, a full-word instruction requiring numerous processing cycles is for example divided into two operation instructions, and the divided operation instructions are processed using separate operation pipelines. By this means, processing of element data which is to be processed in a subsequent half-word instruction ends more quickly, and the vector processor can issue the subsequent half-word instruction earlier. As a result, reductions in operation throughput are suppressed.

In a vector processor having a plurality of operation pipelines, when operators with a large circuit scale such as multipliers or operators with low frequency of use are all implemented in operation pipelines, the circuit scale of the processor as a whole becomes large. Hence operators with a large circuit scale and operators with low frequency of use are implemented in only a portion of operation pipelines among the plurality of operation pipelines.

Vector processors are for example described in Japanese Patent Publication No. 2544770 and Japanese Patent Application Publication No. 2009-193378.

SUMMARY

However, when an operation instruction is divided and processed by a plurality of operation pipelines including a portion of the operation pipelines as described above, if the subsequent operation instruction is an instruction that can be processed only by the relevant portion of operation pipelines, the vector processor cannot issue the relevant subsequent operation instruction. Hence the vector processor delays the issuing of the subsequent operation instruction until the portion of operation pipelines is free. As a result, the operation throughput is reduced.

In accordance with an embodiment, a vector processor includes an instruction fetching unit configured to acquire an instruction from memory to perform an operation on an element data column, a decoding/issuing unit configured to decode the acquired instruction and issuing the decoded instruction in a cycle unit, an operation group configured to include a plurality of operation units each processing the issued instruction; and a register configured to store the element data column in consecutive addresses, wherein the plurality of operation units include a first operation unit which processes a first type instruction and a second operation unit which processes a second type instruction in addition to the first type instruction; and when a plurality of divided instructions, for which the element data of an instruction to be issued has been divided, are processed by the second operation unit, in a case where the second type instruction is not present in an instruction subsequent to the instruction to be issued, the decoding/issuing unit issues the divided instructions, and in a case where the second type instruction is present, the decoding/issuing unit issues the instruction to be issued without performing division.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A-5B are examples explaining element data for each cycle of a half-word instruction;

FIGS. 6A-6B are examples explaining element data for each cycle of a full-word instruction;

FIG. 8 is an example representing processing sequences of operation pipelines when, after a full-word instruction, a half-word instruction is consecutively processed, and a data hazard occurs;

FIG. 10 is an example explaining processing sequences when there is and is not instruction division;

DESCRIPTION OF EMBODIMENTS

Embodiments will be described hereinafter according to the drawings. However, it is noted that the technical scope is not limited to the embodiments described below, but covers the matters described in the claims and the equivalents thereof.

[Summary of Vector Processor]

Figure 1:
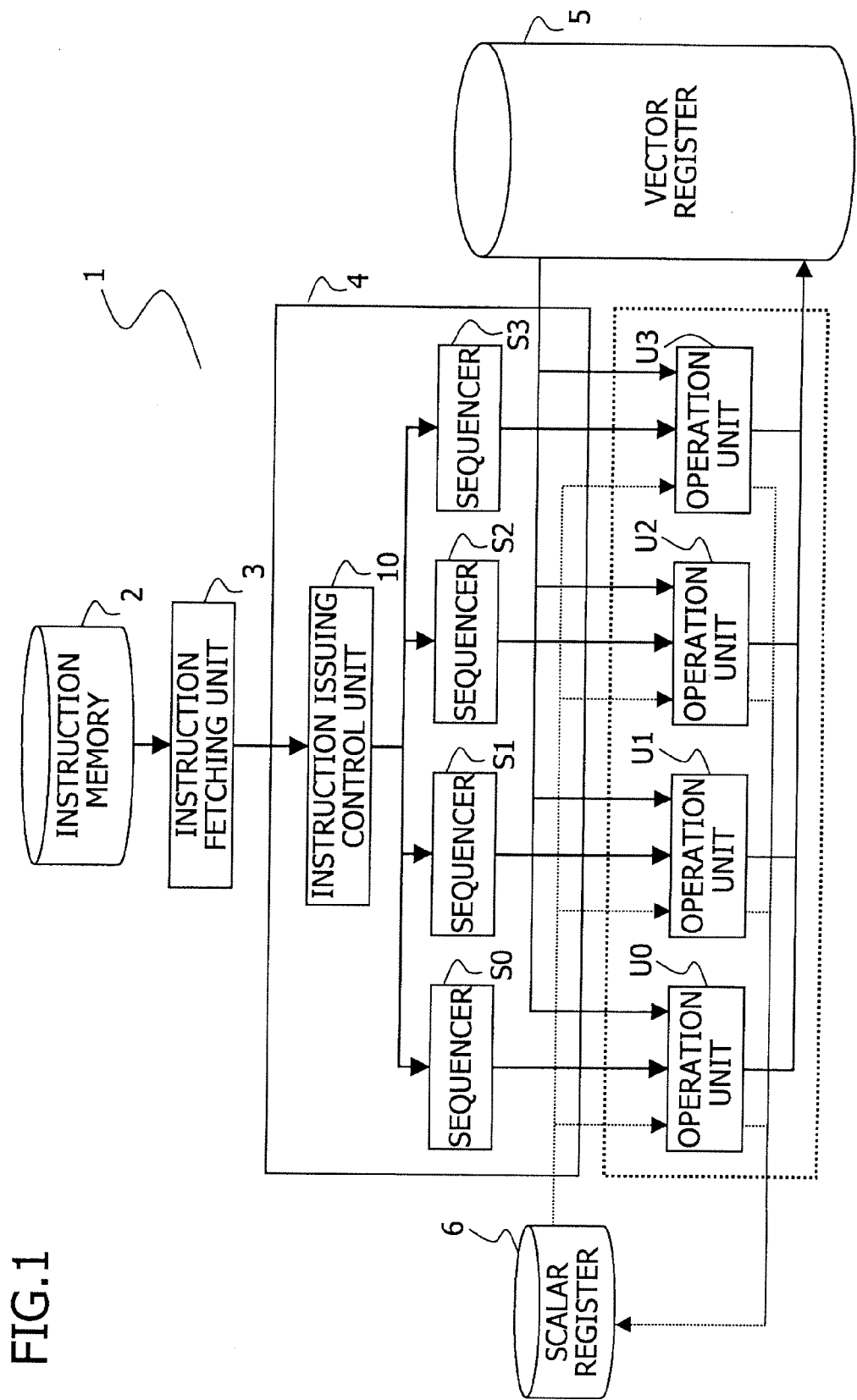
FIG. 1 is an example explaining the configuration of a vector processor to which an embodiment is applied.

FIG. 1 is an example explaining the configuration of a vector processor 1 to which this embodiment is applied. The vector processor 1 performs operation processing of element data forming a prescribed array based on one instruction. The vector processor 1 of the figure has instruction memory 2, an instruction fetching unit 3, an decoding/issuing unit 4, a plurality of operation units U0 to U3, a vector register 5, and a scalar register 6. The vector processor 1 is for example an LSI (Large Scale Integrated circuit) for signal processing.

The instruction memory (memory) 2 stores instructions to be processed by the operation units U0 to U3. The instruction memory 2 is for example SRAM. The instruction fetching unit 3 reads out instructions from the instruction memory 2. The instruction issuing control unit 10 of the decoding/issuing unit 4 decodes an instruction acquired by the instruction fetching unit 3, performs instruction division and change processing as needed, and moreover controls the sequencers S0 to S3. The sequencers S0 to S3 read out instructions and element data used by instructions from the vector register 5 and input the instructions and data to the operation units U0 to U3.

The operation units U0 to U3 function according to respectively input instructions. The operation units U0 to U3 execute arithmetic operations such as addition/subtraction and multiplication, and logic operations, and write element data indicating the operation result to the vector register 5. In the vector register (register) 5, element data forming an array (hereafter, element data columns) are stored in continuous addresses. Element data of an element data column is data for operations by the operation units U0 to U3, and data indicating operation results. In the scalar register 6 are stored data for operations not forming an array, and data indicating an operation result.

In the example of FIG. 1, among the operation units U0 to U3, the operation unit U3 performs division and other specific operations in addition to the various operations. A divider circuit has a large circuit scale, and if implemented in all operation units, would result in an increase in the circuit scale of the processor as a whole. Hence dividers and circuits with low frequency of use are implemented only in the specific operation unit U3.

[Vector Processor Instructions]

Figure 2:
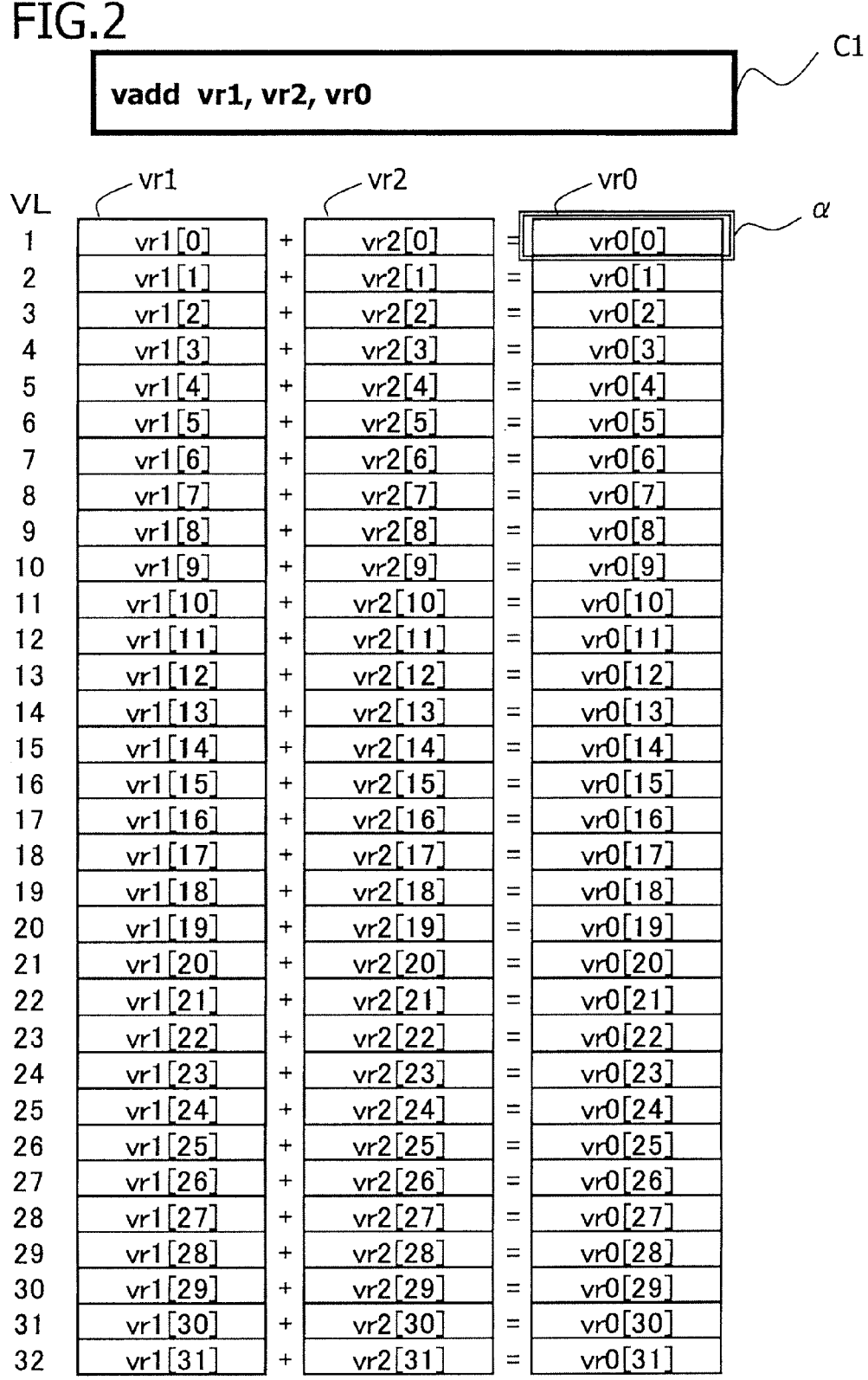
FIG. 2 explains an example of an instruction processed by a vector processor.

FIG. 2 explains an example of instructions processed by the vector processor 1. Instructions processed by the vector processor 1 are for example instructions in which an operation is performed between element data columns in the same column units. The instruction C1 (vadd vr1, vr2, vr0) given as an example in the figure is an instruction in which the element data column vr1 and the element data column vr2, of array size VL 32, are added together, and the result is output as element data to the element data column vr0 and is stored in the vector register 5.

The element data columns vr0 to vr2 of the single instruction comprise element data α with the same bit width. The array size VL of the element data columns vr0 to vr2 is set to be a common value for the vector processor. In the example of this embodiment, the array size VL of element data columns is 32. One instruction is processed by a single operation unit, and any order may be used for processing of each column in an instruction.

Apart from the instruction of the example in FIG. 2, instructions processed by the vector processor 1 may be instructions which output one element data α indicating the maximum value, minimum value, or similar from among an element data column, instructions which output an average value of an element data column, and similar. In such cases, operation results are stored in the scalar register 6 rather than in the vector register 5.

[Vector Processor Processing Sequence]

Next, an instruction processing sequence for each of the operation pipelines P0 to P3 in a vector processor having a plurality of operation units U0 to U3, such as the vector processor of FIG. 1, is explained.

Figure 3:
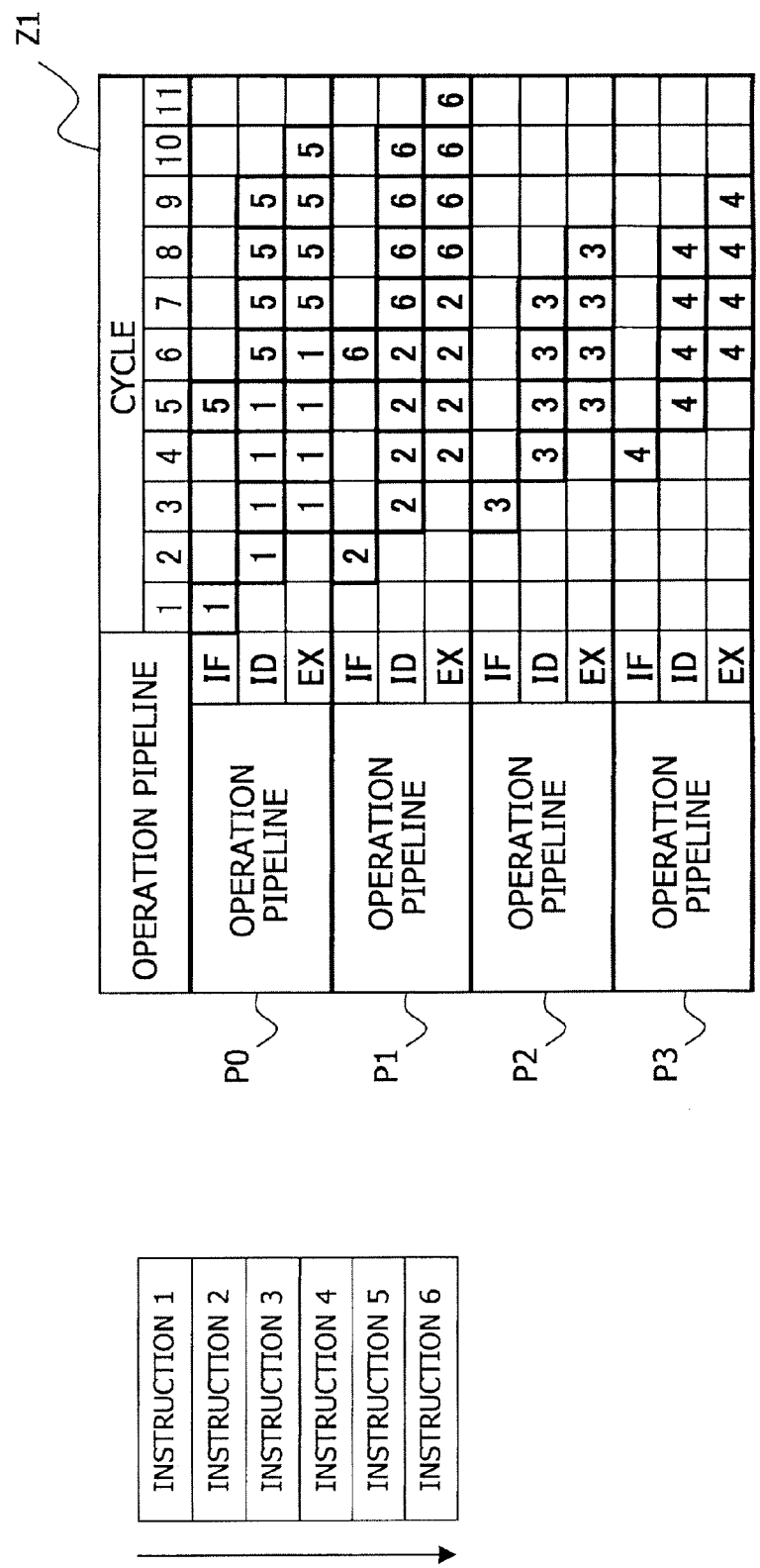
FIG. 3 is an example explaining a processing sequence of an operation pipeline of a vector processor.

FIG. 3 is an example explaining a processing sequence of the four operation pipelines P0 to P3 in the vector processor 1 of FIG. 1. In the processing sequence diagram Z1 in the figure, the vertical axis indicates the processing stage and the horizontal axis indicates time (processing cycle). The numbers 1 to 6 in each of the boxes of the processing sequence diagram Z1 represent instruction 1 to instruction 6 for processing. Instruction 1 to instruction 6 are instructions to perform operations on arrays, as in the example of FIG. 2, and are processed in order from instruction 1 to instruction 6.

The operation pipelines P0 to P3 in this embodiment each have three processing stages. The three processing stages are an instruction fetch stage "fetch" (hereafter, IF stage), an instruction decode/issue stage "decode" (hereafter, ID stage), and an execution stage "execute" in which the instruction is executed by the operation unit (hereafter, EX stage). In for example the ID stage, element data columns for the control and processing of the EX stage are read out from the vector register 5, and in the EX stage processing is also performed to write the operation result to the vector register 5.

In such a vector processor 1, the IF stage and ID stage are executed once only for one instruction. For one instruction, the operation pipelines P0 to P3 fetch an instruction in the IF stage, perform decoding in the ID stage, and use the needed number of processing cycles to perform operation processing of the instruction in the EX stage. In the example of FIG. 3, each instruction is processed using four cycles in the EX stage, and processing is performed using six cycles in three processing stages. The ID stage controls the EX stage, and is the processing state for the number of cycles for the EX stage in FIG. 3.

Further, in the vector processor of this embodiment, one instruction is fetched in a processing cycle unit. That is, instruction fetch processing is not performed with the same timing by the plurality of operation pipelines P0 to P3. Hence in the processing sequence diagram Z1, the instruction 1 is fetched in the operation pipeline P0 in the first cycle, and then in the second cycle, instruction 2 is fetched in the operation pipeline P1. And in the operation pipeline P0, the instruction 5 is fetched in the fifth cycle together with the end of processing of the instruction 1.

In this way, in the vector processor 1 once-only instruction fetching and decoding is performed, and element data is processed sequentially and continuously. By this means, the time for instruction fetching and decoding is reduced, and throughput is improved. Further, in this embodiment the operation units U0 to U3 each comprise a plurality of operators, so that through parallel functioning of operators, still higher throughput is obtained. The operation units U0 to U3 of FIG. 1 each have, for example, eight operators.

Figure 4:
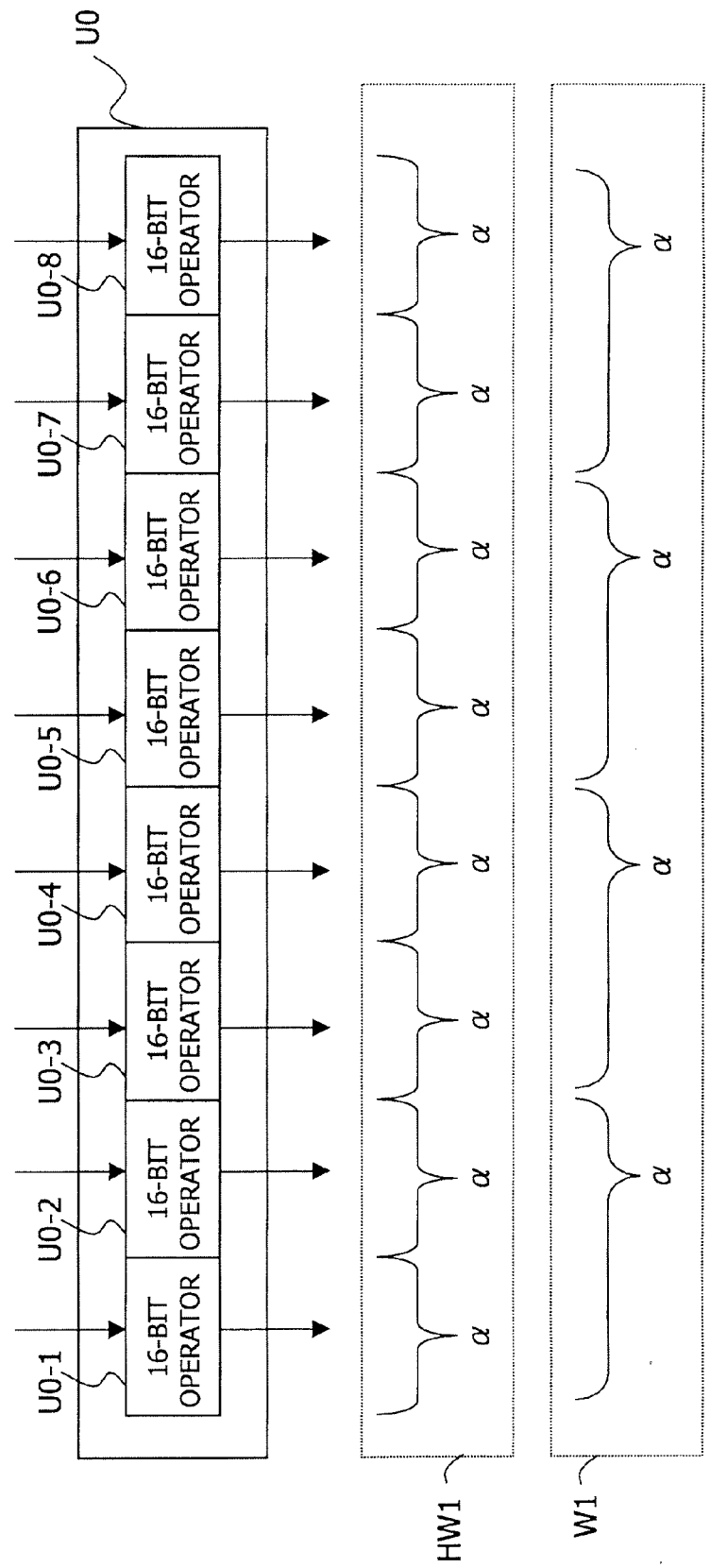
FIG. 4 illustrates an example of an operator having an operation unit.

FIG. 4 illustrates an example of operators U0-1 to U0-8 of the operation units U0 to U3. The operation unit U0 in the figure corresponds for example to the operation unit U0 of FIG. 1. The eight operators U0-1 to U0-8 each perform 16-bit data operation processing in one cycle. The operation unit U0, by having eight operators which each perform a 16-bit operation, performs a 16×8 bit operation in one cycle. The same is true for the other operation units U1 to U3.

The bit width of each element data item α in an element data column of an instruction processed by the vector processor 1 is set to be common for one instruction, but is different between instructions. Depending on the bit width of each element data item α of an instruction, the number of operators U0-1 to U0-8 used for each element data item α differs.

[Bit Width of Instruction Element Data Items]

The bit width of instruction element data is set, for example, depending on the instruction, to 8 bits (byte type), 16 bits (half-word type), 32 bits (full-word type), 64 bits (doubleword type), or similar. Below, an instruction for which the element data is 8 bits is called a byte instruction, an instruction for 16 bits is called a half-word instruction, an instruction for 32 bits is called a full-word instruction, and an instruction for 64 bits is called a doubleword instruction. In this way, when the bit width of the element data α differs depending on the instruction, the number of operators U0-1 to U0-8 used in processing each of the element data items α of the instruction differs, and the number of processing cycles needed in the EX stage of an operation pipeline also differs. Below an explanation is given for examples of a half-word instruction and a full-word instruction.

First, an example HW1 for a half-word instruction is explained. The bit width of each element data item α of a half-word instruction is 16 bits. Hence an element data item α of a half-word instruction is processed by a single operator. This means that eight columns of element data α can be processed in one cycle by the eight operators U0-1 to U0-8. On the other hand, in the case of a full-word instruction (W1), the bit width of each element data item α is 32 bits. Hence the element data α of a full-word instruction is processed by two operators. This means that four columns of element data α can be processed in one cycle by the eight operators U0-1 to U0-8.

When the operators U0-1 to U0-8 are 16-bit operators, instructions with element data bit widths smaller than 16 bits (for example, byte instructions) are excluded from processing. Hence the operators U0-1 to U0-8 in this embodiment process, for example, half-word instructions, full-word instructions, and doubleword instructions.

In this way, the number of columns of element data which can be processed in one cycle in the EX stage differs for half-word instructions and for full-word instructions. Further, the array size VL for each instruction processed by the vector processor 1 is set to a common value, so that the number of processing cycles needed in the EX stage differs for half-word instructions and for full-word instructions. Next, this difference is explained referring to a specific example.

[Example of EX Stage Processing of a Half-word Instruction]

FIGS. 5A-5B are examples explaining element data for each cycle of a half-word instruction in the EX stage of one operation pipeline. The half-word instruction in these examples is for example the instruction C1 (vadd vr1, vr2, vr0) of FIG. 2, and is an instruction in which the result of adding the element data columns vr1 and vr2 is output to the element data column vr0. The bit width of each of the element data items α of the element data columns vr0 to vr2 is 16 bits. In these examples, instruction operation processing is assumed to be performed by the operation unit U0 in FIG. 4.

VR0 to VR95, representing element data items α in FIGS. 5A-5B, indicate addresses of the vector register in which the element data is stored. Specifically, element data items comprised by the element data column vr0 are stored in the continuous addresses VR0 to VR31 of the vector register. Similarly, element data items comprised by the element data column vr1 are stored in the continuous addresses VR32 to VR63 of the vector register, and element data items comprised by the element data column vr2 are stored in the continuous addresses VR64 to VR95.

The operators U0-1 to U0-8 can perform a 16×8 bit operation in one cycle, and so in the case of a half-word instruction, an operation on eight columns of element data can be performed in one cycle. Hence in FIG. 5A, in the initial cycle 1Cy the operation is performed on the element data vr1[1-8] and vr2[1-8] of the array numbers 1 to 8, and the element data vr0[1-8] indicating the operation result are output. Specifically, as illustrated in FIG. 5B, the values of element data vr0[0-7] obtained by adding the element data vr1[1-8] stored at addresses VR32 to VR39 and the element data vr2[1-8] stored at addresses VR64 to VR71 are stored at addresses VR0 to VR7.

Next, in the second cycle 2Cy, as illustrated in FIGS. 5A and 5B, the values of the element data vr0[9-16] resulting from addition of the element data vr1[9-16] stored at addresses VR40 to VR47 and the element data vr2[9-16] stored at addresses VR72 to VR79 are stored at addresses VR8 to VR15. Similar processing is performed in the third cycle 3Cy and the fourth cycle 4Cy.

In this way, in the case of a half-word instruction, the operators U0-1 to U0-8 perform operation processing on eight columns of element data, that is, one-fourth of a column of element data among the array size VL of 32, in one cycle. As a result, EX stage processing ends in four cycles (1Cy to 4Cy). Next, the case of a full-word instruction is explained.

[Example of EX Stage Processing of a Full-word Instruction]

FIGS. 6A-6B are examples explaining element data for each cycle of a full-word instruction in the EX stage of one operation pipeline. The full-word instruction in these examples is for example the instruction (vadd vr2, vr4, vr0), and is an instruction in which the result of addition of the element data columns vr2 and vr4 is output to the element data column vr0. The bit width of each of the element data items α of the element data columns vr0, vr2, vr4 is 32 bits. In these examples, instruction operation processing is assumed to be performed by the operation unit U0 in FIG. 4.

Similarly to FIGS. 5A-5B, VR0 to VR191 represent addresses in the vector register at which the element data is stored. However, in the case of a full-word instruction, the bit width of element data is 32 bits, so that one element data item α is stored in two registers. This is because each of the registers in the vector register 5 corresponds to the number of processed bits of the operators U0-1 to U0-8. Hence the element data comprised by the element data column vr0 is stored at addresses VR0 to VR63, the element data comprised by the element data column vr2 is stored at addresses VR64 to VR127, and the element data comprised by the element data column vr4 is stored at addresses VR128 to VR191.

The operators U0-1 to U0-8 can perform an operation on 16×8 bits in one cycle, and thus in the case of a full-word instruction, can perform an operation on four columns of element data in one cycle. Consequently in FIG. 6A, in the first cycle 1Cy an operation is performed on the element data vr2[1-4] and vr4[1-4] of the array numbers 1 to 4, and the operation results are output to the respective element data vr0[1-4]. Specifically, as in FIG. 6B, the values of the element data vr0[1-4] obtained by adding the element data vr2[1-4] stored at the addresses VR64 to VR71 and the element data vr2[1-4] stored at the addresses VR128 to VR135 are stored at the addresses VR8 to VR15.

Similarly, in the second cycle 2Cy, as illustrated in FIGS. 6A and 6B, the operation results of the array numbers 5 to 8 are stored at the addresses VR8 to VR15. Processing is similar for the succeeding third cycle 3Cy to the eighth cycle 8Cy. In the eighth cycle 8Cy, the operation results of array numbers 29 to 32 are stored at addresses VR56 to VR63. Thus in the case of a full-word instruction, the operators U0-1 to U0-8 perform operation processing of four columns of element data, that is ⅛ column of element data among the array size VL of 32, in one cycle. As a result, the EX stage processing ends in eight cycles (1Cy to 8Cy).

As in FIGS. 5A-5B and FIGS. 6A-6B, when the element data array size VL is 32, the number of cycles needed in the EX stage is four cycles for a half-word instruction and eight cycles for a full-word instruction. Thus the number of cycles for processing differs for a half-word instruction and for a full-word instruction. Next, the vector register in which element data columns are stored is explained, referring to the drawings, for a half-word instruction and for a full-word instruction.

[Unit Vector Register for Half-Word Instruction and Full-Word Instruction]

Figure 7:
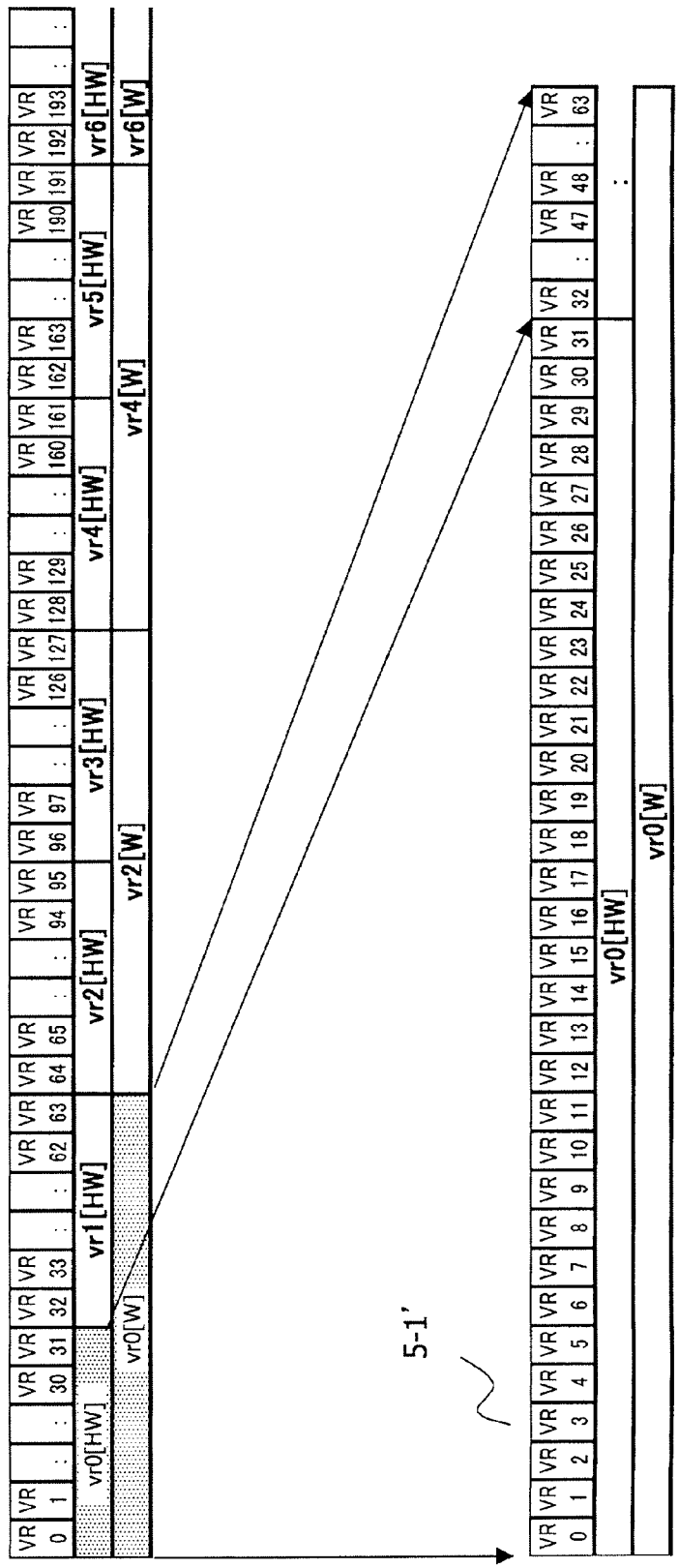
FIG. 7 explains element data columns for a half-word instruction and a full-word instruction.

FIG. 7 explains element data columns, stored in the vector register 8, for a half-word instruction and a full-word instruction. In the figure, 5-1' is an enlarged diagram of 5-1. In FIG. 7, each box denoted by VRxx represents a register bit, and the xx of VRxx indicates the address in the vector register 8. In this example, the number of bits processed by the operators U0-1 to U0-8 is 16 bits, and so the bit width of each register is 16 bits. Regions in the register denoted by vrxx represent a unit vector register in which is stored an element data column of an instruction.

As explained above, in the case of a half-word instruction, the bit width of each element data item of the element data column is 16 bits. Hence the element data columns vr0[HW], vr1[HW], vr2[HW] of a half-word instruction are each stored in 32 continuous registers (unit vector registers) with 16-bit widths. Specifically, as in 5-1 and 5-2 in the figure, the element data column vr0[HW] in a half-word instruction is stored continuously in a total of 32 registers, and addresses VR0, VR1, . . . , VR31. The same is true for the element data columns vr1[HW] and vr2[HW].

On the other hand, in the case of a full-word instruction, the bit width of each of the element data items of the element data column is 32 bits. In this example, the bit width of each register is 16 bits, and so each element data item of the full-word instruction is stored in two registers. Consequently the element data columns vr0[W], vr2[W] and vr4[W] are each stored in 64 continuous registers with bit width of 16 bits. Specifically, as in 5-1 and 5-2 in the figure, the element data column vr0[W] in the full-word instruction is stored continuously in the 64 registers with addresses VR0, VR1, . . . , VR63. The same is true for the element data columns vr2[W] and vr4[W].

In this way, the bit widths of element data are different for half-word instructions and for full-word instructions, and so the size of the unit vector register in which element data columns are stored is also different. In this embodiment, the element data column vr0[W] of a full-word instruction corresponds to the element data column vr0[HW] and the element data column vr1[HW] of a half-word instruction. Similarly, the element data column vr2[W] of a full-word instruction corresponds to the element data column vr2[HW] and the element data column vr3[HW] of a half-word instruction. In this example, the names of the element data columns vr2, vr4 of the full-word instruction are provided in conformity with the element data columns of the half-word instruction.

Processing of instructions with different element data bit widths and the vector register have been explained for examples of a half-word instruction and a full-word instruction, referring to FIG. 4 to FIG. 7. In this way, the number of cycles for processing, and the size of the unit vector register corresponding to element data columns, are different for instructions with different element data bit widths. When performing processing in a plurality of operation pipelines in which instructions with different processing cycles are intermixed, data hazards may occur. The vector processor 1 delays issuing of subsequent instructions in order to avoid data hazards. Next, data hazards and a specific example thereof are explained.

[Data Hazards]

Data hazards are one type of pipeline hazards. A data hazard is a condition in which, when performing pipeline processing, issuing of a subsequent instruction is delayed due to dependence relations between a plurality of instructions. Among pipeline hazards, a data hazard is a hazard which occurs due to dependence relations between data to be processed.

Data hazards include, for example, Read After Write (RAW) hazards and Write After Read (WAR) hazards. A RAW hazard is a hazard in which, when after an instruction (preceding instruction) another instruction (subsequent instruction) is processed, before the preceding instruction writes the operation result to a register, the subsequent instruction reads the value from the register. On the other hand, a WAR hazard is a hazard in which, before a preceding instruction reads out data from a register, a subsequent instruction writes a value to the register. When a data hazard seems to occur, the vector processor 1 avoids the data hazard by for example delaying the issuing of the subsequent instruction.

[Specific Example of Delay Due to Data Hazards]

FIG. 8 is an example representing processing sequences of operation pipelines P0 to P3 when, after a full-word instruction, a half-word instruction is consecutively processed, and a data hazard occurs. The upper processing sequence diagram Z2-1 and the lower processing sequence diagram Z2-2 are processing sequence diagrams in the EX stage in cases in which a RAW hazard and a WAR hazard, respectively, occur.

In the processing sequence diagrams Z2-1 and Z2-2 of FIG. 8, numerical values in boxes indicate the initial number of addresses (for example, 0 in VR0) in the address of the vector register (for example, VR0 to VR07) at which element data columns for processing in each cycle of the EX stage are stored. For example, here the numeric value 0 in the first cycle for the operation pipeline P0 in the processing sequence diagram Z2-1 indicates that operation processing is performed on element data stored in addresses VR0 to VR7 of the vector register.

First, the processing diagram Z2-1 is explained. In the figure, a full-word instruction W1 is processed in the operation pipeline P0, and then a half-word instruction HW1 is processed in the operation pipeline P1. Specifically, the full-word instruction W1 (vand vr2, vr4, vr0) is an instruction which adds the element data column vr2 and the element data column vr4 on an array basis, and outputs the result as the element data column vr0. The half-word instruction HW1 (vsllh, vr1, vr6, vr7) is an instruction which, for each element data item of the element data column vr1, performs left-shifting by the number of bits specified by the element data item in the same array of the element data column vr6, and outputs the result as the element data column vr7.

In this example, as indicated in the vector register 5-2 of FIG. 8, the element data column vr1 [HW] of the subsequent half-word instruction HW1 corresponds to the element data column of the second half of the array (VR32 to VR63) among the element data column vr0[W] which is the operation result of the preceding full-word instruction W1. According to the processing sequence diagram Z2-1, for the full-word instruction W1, the values of the subsequent element data column of the element data column vr0[W] are finalized in cycle 5 through cycle 8. Hence in the sixth and later cycles, the operation pipeline P1 begins processing of the EX stage of the subsequent half-word instruction HW1 (delay due to a RAW hazard). As a result, processing of the half-word instruction HW1 is delayed by four cycles D1 from the second cycle in which the start of processing by the operation pipeline P1 is possible.

Next, the processing sequence diagram Z2-2 is explained. In this figure, the full-word instruction W2 is processed in the operation pipeline P0, and then the half-word instruction HW2 is processed in the operation pipeline P1. Specifically, the full-word instruction W2 (vand vr0, vr2, vr4) is an instruction in which the element data column vr0 and the element data column vr2 are added on an array basis, and the result is output as the element data column vr4. The half-word instruction HW2 (vsllh vr6, vr7, vr1) is an instruction which, for each element data item of the element data column vr6, performs left-shifting by the number of bits specified by the element data item in the same array of the element data column vr7, and outputs the result as the element data column vr1.

In this example, the element data column vr1[HW] to which the operation result of the subsequent half-word instruction HW2 is output corresponds to the element data column (VR32 to VR63) of the second-half array of the element data column vr0[W] for processing by the preceding full-word instruction W2. Hence after processing to read out the second-half element data column of the full-word instruction W2 ends, output of the operation result to the element data column vr1[HW] of the subsequent half-word instruction HW2 is performed. Thus the operation pipeline P1 starts processing of the EX stage of the subsequent half-word instruction HW2 in the sixth or later cycle (delay due to the WAR hazard). As a result, processing of the half-word instruction HW2 is delayed by four cycles D2 from the second cycle in which the start of processing by the operation pipeline P1 is possible.

In this way, when for example a half-word instruction is executed subsequently to a full-word instruction, if there is a dependence relation between the second-half element data of the preceding full-word instruction and the element data of the subsequent half-word instruction, issuing of the subsequent half-word instruction is delayed. In such a case, the vector processor 1 alleviates the delay in the subsequent instruction issuing by dividing the preceding full-word instruction.

[Instruction Division]

Figure 9:
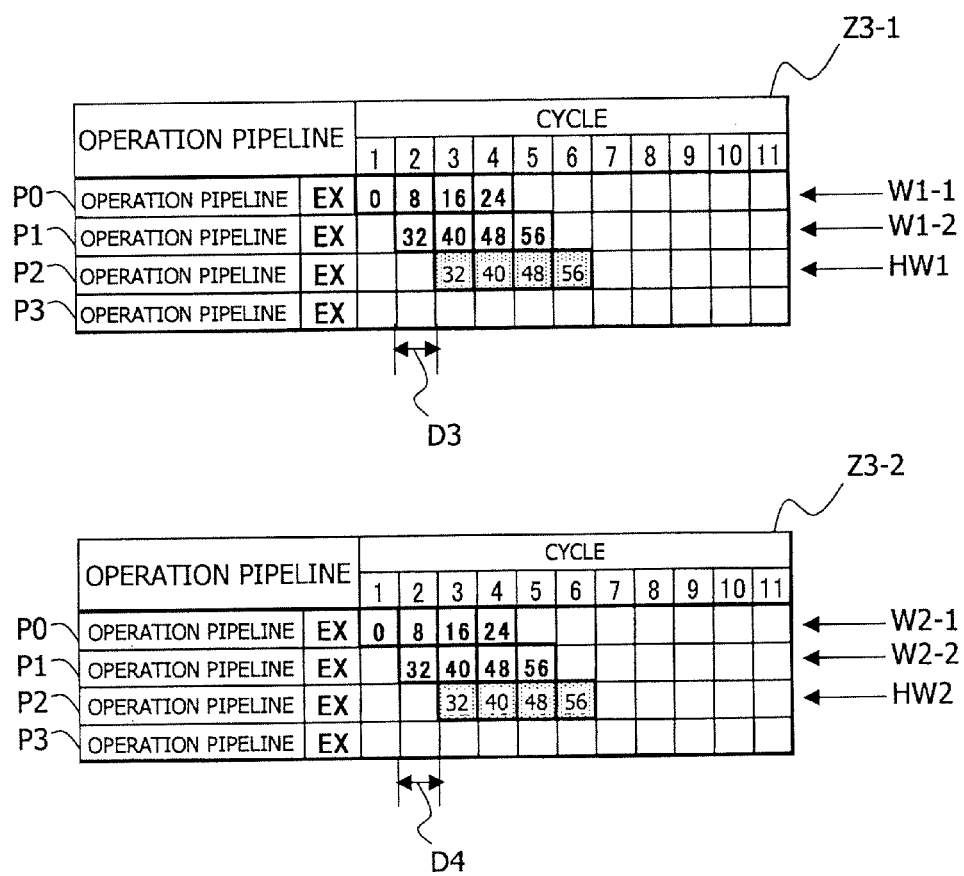
FIG. 9 is an example explaining a processing sequence of a subsequent half-word instruction resulting from division of a full-word instruction.

FIG. 9 is an example explaining a processing sequence of a subsequent half-word instruction resulting from division of a full-word instruction in FIG. 8. The processing sequence diagram Z3-1 in the figure corresponds to the processing sequence diagram Z2-1 in FIG. 8, and the processing sequence diagram Z3-2 corresponds to the processing sequence diagram Z2-2 in FIG. 8.

First, the processing sequence diagram Z3-1 is explained. In the figure, the full-word instruction W1 is divided into two divided full-word instructions W1-1 and W1-2. The divided full-word instructions W1-1 and W1-2 are to be processed respectively by the demarcated element data columns vr0-1[W] and vr0-2[W], resulting from demarcation into halves of the array of the element data column vr0[W]. Specifically, the demarcated element data column vr0-1[W] corresponds to the element data column with array numbers 1 to 16 of the element data column vr0[W], and the demarcated element data column vr0-2[W] corresponds to the element data column with array numbers 17 to 32 of the element data column vr0[W].

The number of processing cycles needed in the EX stages of each of the divided full-word instructions W1-1 and W1-2 is shortened from eight cycles to four cycles, due to the fact that the number of arrays of the element data column to be processed is reduced by half. Further, by using the separate operation pipelines P0 and P1 to process the divided full-word instructions W1-1 and W1-2, processing of the subsequent half-word instruction HW1 can be started from the third cycle. As a result, the delay of the half-word instruction HW1 can be held to one cycle D3.

The same is true of the processing sequence diagram Z2-2. In this diagram, the full-word instruction W2 is divided into two divided full-word instructions W2-1 and W2-2. The divided full-word instructions W2-1 and W2-2 are to be processed respectively by the demarcated element data columns vr0-1[W] and vr0-2[W], resulting from demarcation into halves of the array of the element data column vr0[W]. As a result, the number of processing cycles needed in the EX stages of each of the divided full-word instructions W2-1 and W2-2 is shortened from eight cycles to four cycles. Further, by using the separate operation pipelines P0 and P1 to process the divided full-word instructions W2-1 and W2-2, processing of the subsequent half-word instruction HW2 can be started from the third cycle. As a result, the delay of the half-word instruction HW2 can be held to one cycle D4.

In this way, through instruction division, processing throughput is improved. However, at this time other delay factors may occur in the vector processor due to instruction division.

[Other Delays Due to Instruction Division]

As indicated above in FIG. 1, the vector processor 1 in this embodiment has a plurality of operation units U0 to U3; part of the operation units (hereafter, a specific operation unit) U3, in addition to the normal operations, performs division operations and other specific operation processing. Hence division instructions are processed by the operation pipeline (specific operation pipeline) P3 corresponding to the specific operation unit U3. However, when using different operation pipelines to process a plurality of divided full-word instructions obtained by dividing a full-word instruction, in some cases the specific operation pipeline P3 is used. At this time, when a division instruction is subsequent to a full-word instruction, issuing of the division instruction is delayed until the specific operation pipeline P3 is in the free state, and processing throughput declines. An explanation is given below based on a specific example.

FIG. 10 is an example explaining processing sequences when there is and is not instruction division. The processing sequence diagram Z4-1 is an example of a processing sequence diagram in a case when instruction division is performed, and the processing sequence diagram Z4-2 is an example of a case in which instruction division is not performed. In the figure, numbers 1 to 6 in the boxes indicate instruction 1 to instruction 6; the instructions are processed in order from instruction 1 to instruction 6. In this example, instruction 3 is a full-word instruction, and the other instructions 1, 2 and 4 to 6 are half-word instructions. Further, the instruction 4 is a division instruction, and can only be processed by the specific operation pipeline P3.

In this example, among the element data columns (columns 1 to 32) of the full-word instruction 3, the second-half element data columns (columns 17 to 32) are in a dependence relation with the element data columns of the half-word instruction 5. Hence processing of the EX stage of instruction 5 can be started from the eighth cycle, in which the values of the second-half element data columns of the instruction 3 are finalized. Hence in order to improve processing throughput, the instruction 3 is divided, and the divided instructions are for example processed by the operation pipelines P2 and P3 (Z4-1). However, by using the specific operation pipeline P3, processing of the division instruction 4 wait until the special operation pipeline P3 is in the free state. As a result, processing of the instruction 5 can be started from the ninth cycle, and compared with the case in which the instruction 3 is not divided (Z4-2), the start cycle is delayed one cycle.

First Embodiment

In the vector processor 1 of this embodiment, when a plurality of divided instructions for which the element data of an instruction to be issued is divided occupy a specific operation pipeline, when in the instruction subsequent to the instruction to be issued there is a specific instruction, such as a division instruction or similar, which can only be processed by the specific operation pipeline, the instruction to be issued is issued without division. On the other hand, when there is no specific instruction subsequent to the instruction to be issued, the vector processor 1 divided the instruction to be issued and issued the plurality of divided instructions.

That is, when, subsequent to an instruction to be divided (in the example of FIG. 10, instruction 3), there is a specific instruction (in the example of FIG. 10, instruction 4) which can only be processed by the specific operation pipeline P3, and by dividing the instruction to be divided a delay occurs in the issuing of the specific instruction occupying the specific pipeline P3, the vector processor 1 of this embodiment issues the instruction to be divided as the original single instruction, without performing division.

[Judgment of Instruction Division]

The processing sequence diagram Z4-2 in FIG. 10 is an example of a processing sequence diagram in a case in which an instruction 3 is not divided. When there is an instruction 4 which can be processed only by the specific pipeline P3 subsequent to an instruction 3 to be divided, and a divided instruction of the instruction 3 occupies the specific operation pipeline P3, the vector processor 1 of this embodiment does not divided the instruction 3. As a result, the instruction 3 is processed by one operation pipeline P2, and the instruction 4 can be processed by the specific operation pipeline P3 from the fourth cycle. Further, processing of the instruction 5 is started from the eighth cycle, based on the dependence relation with the element data in the second half of the array of the instruction 3.

As a result, the start cycle for the instruction 5 is earlier by one cycle D5 compared with the case (Z4-1) in which the instruction 3 is divided. As a result, processing throughput is improved. Thus in the vector processor of this embodiment, when a plurality of divided instructions resulting from division of the element data of an instruction for issuing occupy a specific operation pipeline, if there is a specific instruction subsequent to the instruction to be issued, by not dividing the instruction, processing throughput is improved.

Further, when an instruction to be issued is not divided because there is a specific instruction, the vector processor 1 of this embodiment changes the order of processing of the element data columns of the instruction to be issued so as to preferentially process an element data column in a dependence relation with a subsequent instruction, to further improve processing throughput.

That is, among the element data columns of an instruction 3, by preferentially processing a second-half element data column in a dependence relation with an element data column of an instruction 5, the vector processor 1 of this embodiment enables an earlier start cycle for processing of the instruction 5. Next, an explanation is given based on a specific example.

[Changing the Order of Processing of Element Data of an Instruction]

Figure 11:
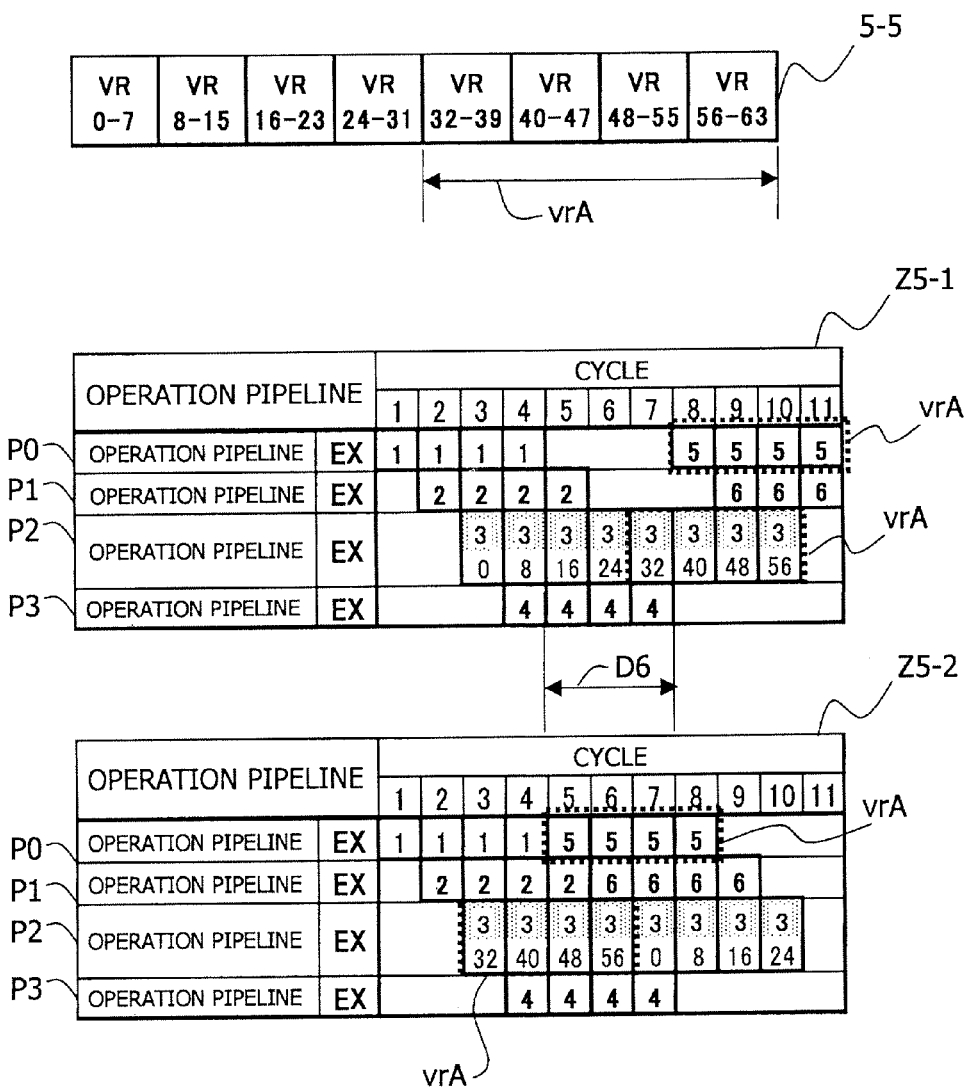
FIG. 11 is an example explaining processing sequences resulting from change in the order of processing of element data columns of an instruction.

FIG. 11 is an example explaining processing sequences resulting from changing the order of processing of element data columns of an instruction. The diagram Z5-1 is the processing sequence diagram for a case in which the processing order of element data columns of an instruction 3 is not changed, and the diagram Z5-2 is the processing sequence diagram for a case in which the processing order of element data columns of the instruction 3 is changed. The vector register 5-5 of FIG. 11 indicates the unit vector registers (VR0 to VR63) in which operation results for array numbers 1 to 32 of the instruction 3 are stored. Of the registers VR0 to VR63, element data to be processed in instruction 5 is stored in the registers VR32 to VR63 (vrA).

In the processing sequence diagram Z5-1 of FIG. 11, the element data columns with array numbers 1 to 16 (VR0 to VR31) are processed in cycles 3 to 6, and the element data columns vrA (VR32 to VR63) with array numbers 17 to 32 are processed in cycles 7 to 10. That is, element data columns are processed in order from arrays with smaller numbers. Hence processing of the instruction 5 can be started from the eighth cycle.

On the other hand, in the processing sequence diagram Z5-2, the element data columns vrA (VR32 to VR63) with array numbers 17 to 32 are preferentially processed relative to the element data columns (VR0 to VR31) with array numbers 1 to 16. As a result, the values of the element data columns vrA in a dependence relation with the instruction 5 are finalized in cycles 3 to 6, and processing of the instruction 5 can be started from the fourth cycle. In this example, in the fifth cycle following the processing start cycle (fourth cycle) of the instruction 4, processing of the instruction 5 is started. As a result, the processing start cycle for the instruction 5 is earlier by three cycles D6.

In this way, in the vector processor of this embodiment, when an instruction to be issued is not divided because there is a specific instruction, the order of processing of element data columns of the instruction is changed and instructions issued such that, among demarcated element data columns resulting from demarcation of element data columns of the instruction to be issued, demarcated element data columns which are in a dependence relation with the subsequent instruction are preferentially processed. As a result, the processing throughput of the vector processor, which has been improved by not dividing the instruction, can be further improved. Also, even in cases where processing throughput falls because an instruction is not divided, processing throughput can be improved.

Next, in relation to processing of the vector processor 1 of this embodiment, the configuration of the decoding/issuing unit 4 of the vector processor 1 and a flowchart of processing of the decoding/issuing unit 4 are explained in sequence.

[Configuration of the Decoding/Issuing Unit in the Present Embodiment]

Figure 12:
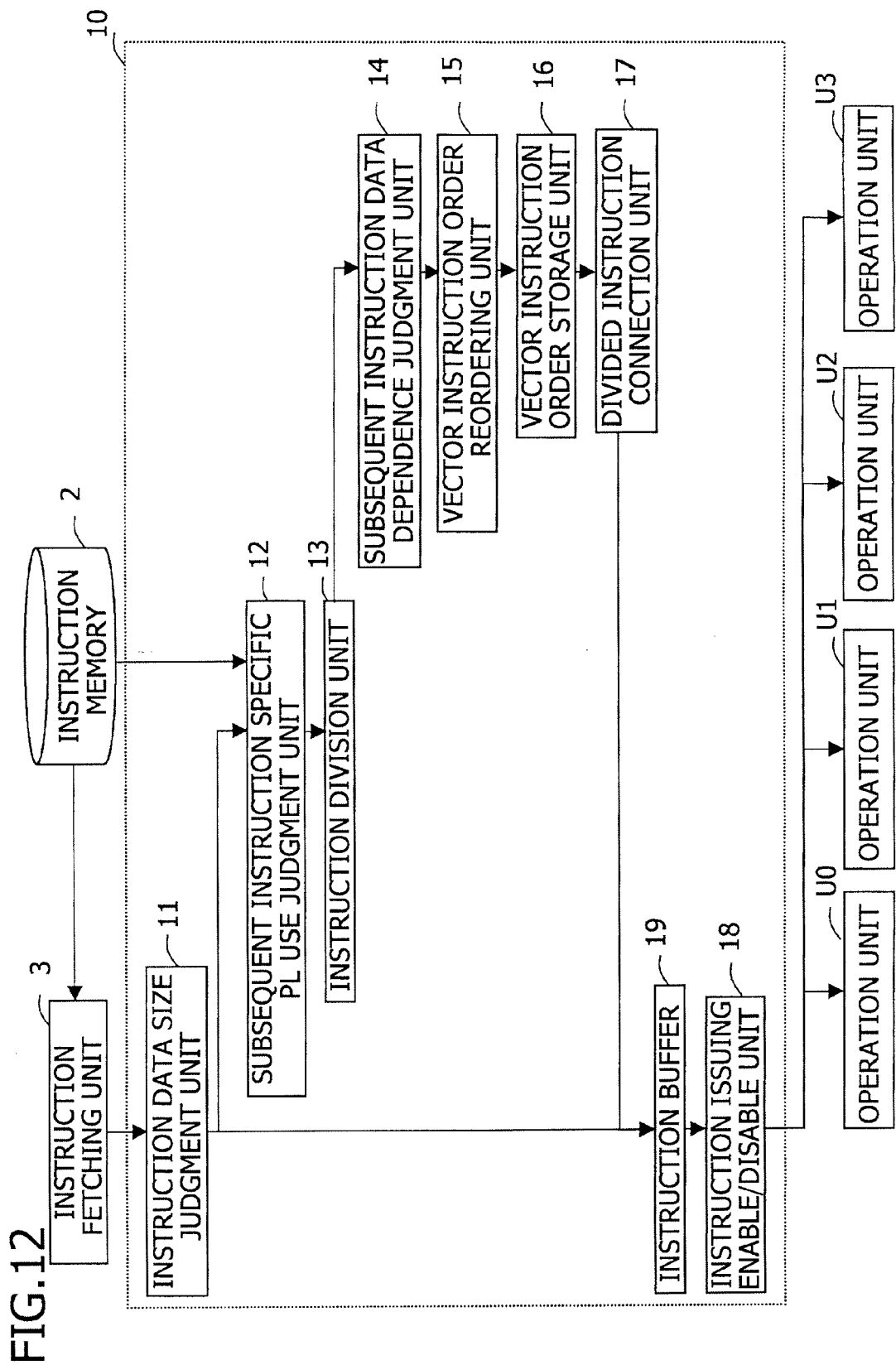
FIG. 12 is an example illustrating the configuration of an instruction issuing control unit of a decoding/issuing unit.

FIG. 12 is an example illustrating the configuration of the instruction issuing control unit 10 of the decoding/issuing unit 4 in the vector processor 1 of this embodiment. The instruction issuing control unit 10 has, for example, an instruction data size judgment unit 11, subsequent instruction specific PL use judgment unit 12, instruction division unit 13, subsequent instruction data dependence judgment unit 14, vector instruction order reordering unit 15, vector instruction order storage unit 16, divided instruction connection unit 17, instructing issuing enable/disable unit 18, and instruction buffer 19.

An instruction fetching unit 3 inputs an instruction read out from the instruction memory 2 to the decoding/issuing unit 4. The instruction issuing control unit 10 of the decoding/issuing unit 4 controls the instruction as needed based on a judgment as to whether instruction division and a change in the order of processing of element data is needful, and inputs the instruction to the operation units U0 to U3 via the sequencers S0 to S3. Next, details of the processing of each unit in the instruction issuing control unit 10 of the decoding/issuing unit 4 are explained based on a flowchart.

[Flow of Processing of the Decoding/Issuing Unit 4 in the Present Embodiment]

Figure 13:
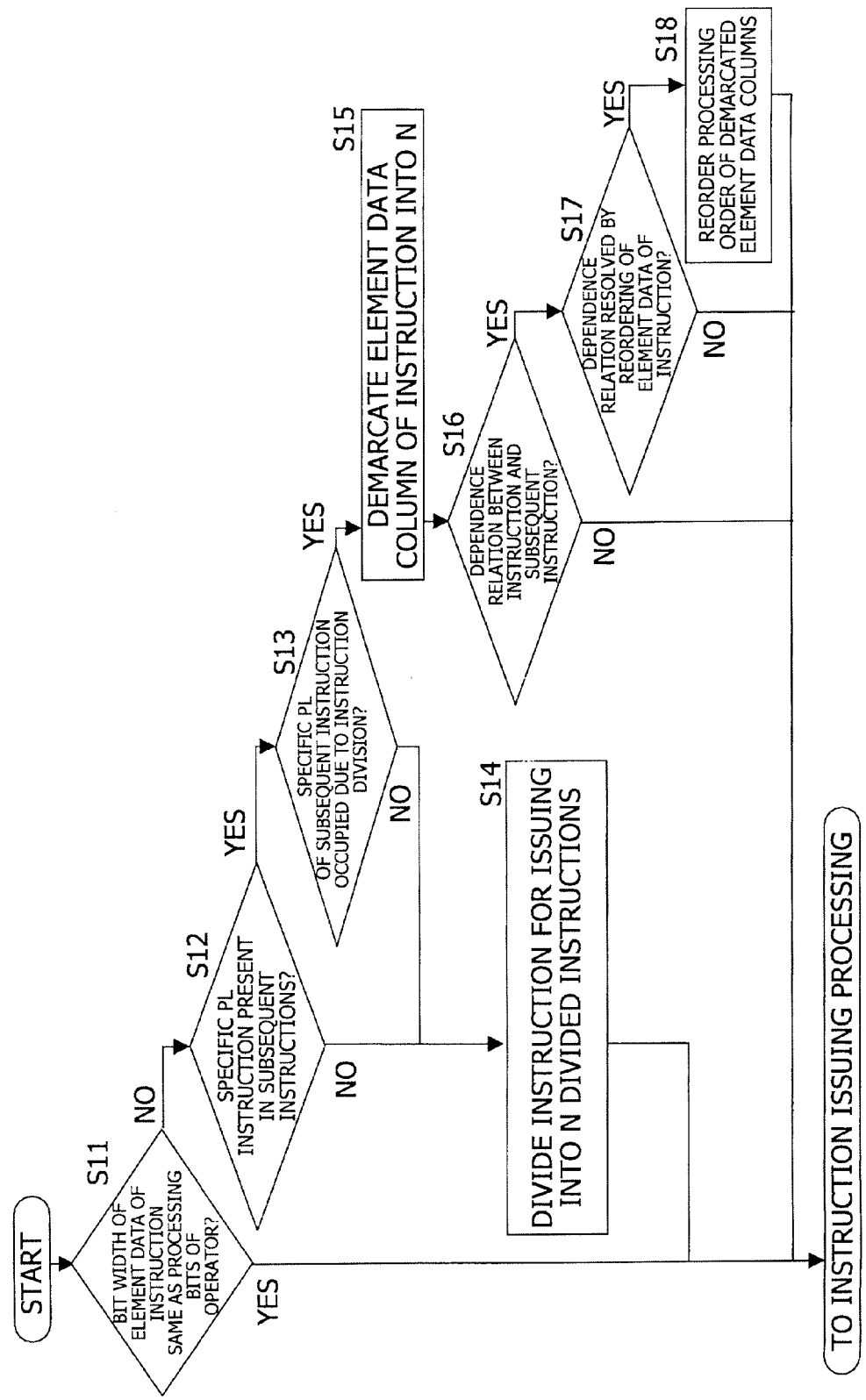
FIG. 13 is a flowchart explaining in detail processing of an instruction issuing control unit.

FIG. 13 is a flowchart explaining in detail processing of the instruction issuing control unit 10 of the decoding/issuing unit 4. The instruction data size judgment unit 11 of the instruction issuing control unit 10 first judges the bit width of element data of an instruction acquired from the instruction fetching unit 3. Specifically, the instruction data size judgment unit 11 judges whether the bit width of the element data is the same as the number of processing bits of the operators (S11). If the two are the same (YES in S11), no instruction change is performed. This is the case, for example when the operator is a 16-bit operator, when the instruction is a half-word instruction, as illustrated in FIG. 4.

On the other hand, when the bit width of the element data is different from the number of processing bits of the operators (NO in S11), that is, when the bit width of the instruction element data is greater than the number of processing bits of the operators, the subsequent instruction specific PL use judgment unit 12 judges whether an instruction subsequent to the acquired instruction is an instruction that can only be processed by the specific operation pipeline P3 (S12). An instruction the element data bit width of which is greater than the number of processing bits of the operators means, for the example of 16-bit operators as in FIG. 4, a full-word instruction or a doubleword instruction, or similar. At this time, a subsequent instruction includes, at most, an instruction issued before the end of processing of the plurality of divided instructions in a case in which the instruction is divided.

When a subsequent instruction is a specific instruction that can only be processed by the specific operation pipeline P3 (YES in S12), the subsequent instruction specific PL use judgment unit 12 further judges whether, as a result of dividing and issuing the instruction, the specific operation pipeline P3 is occupied (S13). If there is no occupation (NO in S13), or if there is no subsequent specific instruction (NO in S12), the instruction division unit 13 divides the instruction into a plurality of divided instructions (S14).

Instruction division is performed when, among instructions (subsequent instructions) which are subsequent to the instruction to be issued (preceding instruction) requiring M (M≥1)×N (N≥2) operators for one element data item, there is a subsequent instruction which is an instruction requiring M operators for one element data item, and which, among first demarcated element data columns resulting from demarcation into N columns of the element data columns of the instruction to be issued and second demarcated element columns to be processed thereafter, is in a dependence relation with a second demarcated element data column. Through instruction division, from the preceding instruction to be issued are generated and issued N divided instructions which are to process the first and second demarcated data columns. At this time, a subsequent instruction includes, at most, an instruction issued before the end of processing of the preceding instruction, the bit width of which is N times that of the subsequent instruction.

For example, as in FIG. 10, for an example of 16-bit operators as in FIG. 4, when the preceding instruction is a full-word instruction (32 bits) and a subsequent instruction is a half-word instruction, the following instruction division is performed. Specifically, when subsequently to the full-word instruction there is a half-word instruction in a dependence relation with a demarcated element data column to be processed afterward among the demarcated element data columns resulting from demarcation into two (N) of the element data columns of the full-word instruction, division of the full-word instruction is performed. At this time the full-word instruction is divided into two divided instructions, which are to process two (N) demarcated element data columns, and which are issued.

Further, in an example of 16-bit operators as in FIG. 4, a case is considered in which the preceding instruction is a doubleword instruction (64 bits) and a subsequent instruction is a half-word instruction (16 bits). At this time, when subsequently to the doubleword instruction there is a half-word instruction in a dependence relation with a demarcated element data column other than the initially processed demarcated element data column among the four (N) demarcated element data columns resulting from demarcation of the element data column of the doubleword instruction, division of the doubleword instruction is performed. At this time, the doubleword instruction is divided into four (N) divided instructions, which are to process four demarcated element data columns, and which are issued.

In the examples of 16-bit operators as in FIG. 4, a case in which the preceding instruction is a doubleword instruction (64 bits) and a subsequent instruction is a full-word instruction (32 bits) was taken as an example. At this time, subsequently to the doubleword instruction, among the demarcated element data columns resulting from demarcation into two (N) of the element data column of the doubleword instruction, when there is a full-word instruction in a dependence relation with the demarcated element data column other than the demarcated element data column processed initially, division of the doubleword instruction is performed. At this time, the doubleword instruction is divided into two (N) divided instructions, which are issued.

In this way, by dividing a preceding instruction, the bit width of which is N times that of a subsequent instruction, into N instructions, the numbers of processing cycles of the preceding instruction and the subsequent instruction become the same. As a result, even when there is overlap of the element data columns for processing between the preceding and the subsequent instructions, in a processor in which instructions are fetched in cycle units, the number of processing cycles is made the same for each instruction, so that delays due to data hazards can be avoided or alleviated. Hence in a vector processor which processes instructions with different element data bit widths, declines in processing throughput occurring due to differences in element data bit widths between instructions are alleviated.

Returning to the flowchart, when a specific operation pipeline is occupied (YES in S13), the instruction division unit 13 demarcates the element data column of the instruction into N demarcated element data columns (S15). Then, the subsequent instruction data dependence judgment unit 14 judges whether there is a dependence relation between a demarcated element data column other than the initially processed demarcated element data column and an element data column of a subsequent instruction (S16). At this time, a subsequent instruction includes, at most, an instruction issued before the end of processing of the preceding instruction to be issued, the bit width of which is N times that of the subsequent instruction.

When there is a dependence relation (YES in S16), the vector instruction order reordering unit 15 judges whether, by reordering the processing order of the instruction demarcated element data such that a demarcated element data column in a dependence relation is preferentially processed, the dependence relation is resolved (S17). If the dependence relation is resolved (YES in S17), the vector instruction order reordering unit 15 reorders, in demarcated element data units, the processing order of the element data columns of the instructions to be issued, such that a demarcated element data column in a dependence relation is preferentially processed (S18). Then, the vector instruction order storage unit 16 and the divided instruction connection unit 17 store the instruction, after changing connected demarcated element data columns, in the instruction buffer 19.

On the other hand, when there is no dependence relation (NO in S16), or when the dependence relation is not resolved (NO in S17), the vector instruction order reordering unit 15 does not reorder the processing order of the demarcated element data of the instruction. The vector instruction order storage unit 16 and divided instruction connection unit 17 store the instruction, without being changed, in the instruction buffer 19.

Next, the instruction issuing enable/disable unit 18 judges whether the instruction stored in the instruction buffer 19 can be issued, and inputs the instruction into operation pipelines via the sequencers S0 to S3. This processing is explained based on a flowchart.

Figure 14:
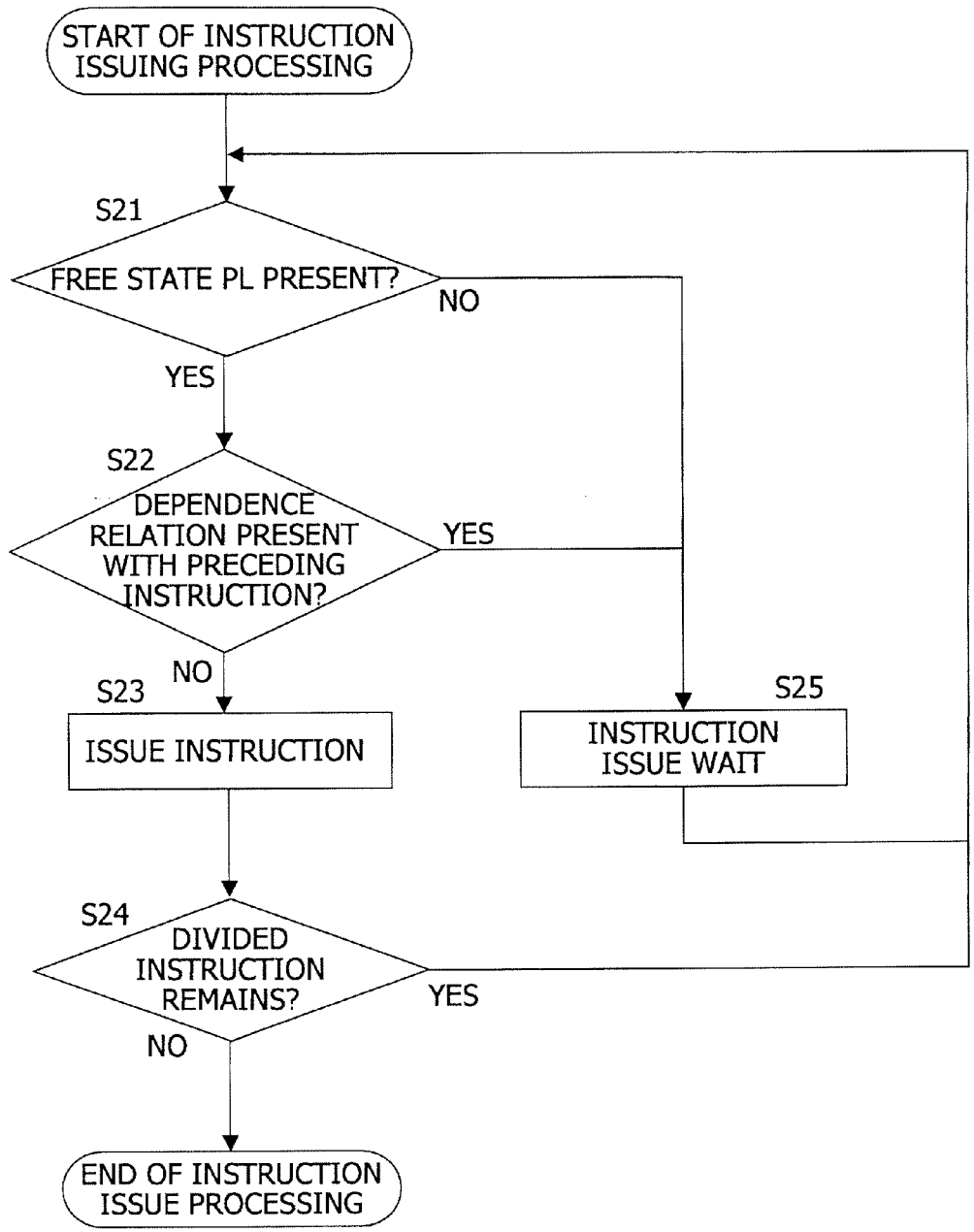
FIG. 14 is a flowchart explaining processing of an instruction issuing enable/disable unit.

FIG. 14 is a flowchart is a flowchart explaining processing of the instruction issuing enable/disable unit 18 in the instruction issuing control unit 10. In the figure, the instruction issuing enable/disable unit 18 judges whether there is an operation pipeline in the free state (S21). If there is no operation pipeline in the free state (NO in S21), the instruction issuing enable/disable unit 18 causes issuing of the instruction to wait (S25). If on the other hand there is a free operation pipeline (YES in S21), the instruction issuing enable/disable unit 18 judges whether there is a dependence relation of element data columns between the instruction to be issued and an instruction already in processing in an operation pipeline (S22). If there is a dependence relation, that is, if an error hazard occurs (YES in S22), the instruction issuing enable/disable unit 18 causes issuing of the instruction to wait (S25).

On the other hand, if there is no dependence relation (NO in S22), the instruction issuing enable/disable unit 18 issues the instruction via a sequencer to an operation pipeline in the free state. Then, if an issued instruction is a divided instruction and there remains another divided instruction which was generated based on the same instruction (YES in S24), the instruction issuing enable/disable unit 18 similarly judges whether there is a free operation pipeline (S21). In this way, divided or changed instructions are issued to operation pipelines as needed.

As described above, in the vector processor of this embodiment, when a plurality of divided instructions for which element data of the instruction to be issued have been divided are processed by the specific operation unit, if instructions subsequent to the instruction to be issued do not include an instruction which can be processed only by the specific operation unit, divided instructions are issued. And, when there is the instruction which can be processed only by the specific operation unit, the vector processor issues the instruction to be issued without performing division.

Thus in the vector processor of this embodiment, by causing the specific operation unit to be occupied by division of an instruction, delaying of the issuing of a specific instruction which can be processed only by the operation unit is avoided. Further, when in the vector processor the specific operation unit is not occupied even when an instruction is divided, or when there is no subsequent specific instruction, by dividing the instruction, delays due to data hazards with a subsequent instruction are alleviated.

Further, in the vector processor of this embodiment, when an instruction to be issued is not divided, if there is a dependence relation between a subsequent instruction and a demarcated element data column other than the initially processed demarcated element data column among the demarcated element data columns resulting from demarcation of the element data column of the instruction to be issued, the processing order of the element data columns is changed and processing performed such that the demarcated element data column with the dependence relation is preferentially processed.

Thus in the vector processor of this embodiment, when an instruction to be divided is issued as the original single instruction without being divided, by giving preference to and processing in advance a portion of the element data columns in a dependence relation with a subsequent instruction, the subsequent instruction can be issued earlier.

As described above, through the vector processor of this embodiment, even when instructions with different element data bit widths are intermixed and processed, delays in issuing specific instructions arising from instruction division are avoided, and delays in issuing subsequent instructions based on data hazards can be avoided or alleviated. As a result, in the vector processor of this embodiment, even when instructions with different element data bit widths are intermixed and processed, processing throughput can be improved.

In FIG. 4 to FIG. 11, examples were explained of a vector processor in which the number of processing bits of the operators U0-1 to U0-8 is 16 bits; but in another embodiment, a vector processor is explained in which the number of processing bits is 8 bits and the instruction array size VL is set to 64.

Second Embodiment

A vector processor in which the number of processing bits of an operator is 8 bits processes byte instructions of 8 bits in addition to, for example, half-word instructions with an element data bit width of 16 bits, full-word instructions with 32 bits, and doubleword instructions with 64 bits. In this example, it is assumed that processing is performed by six operation pipelines P0 to P5. Further, the operation pipeline P5 is a specific operation pipeline P5 which processes specific operation instructions. Also, as described above, the array size VL is set to 64. Judgment of instruction division and changes in the order of processing of element data columns in this case are explained based on specific examples.

[Judgment of Instruction Division]

Figure 15:
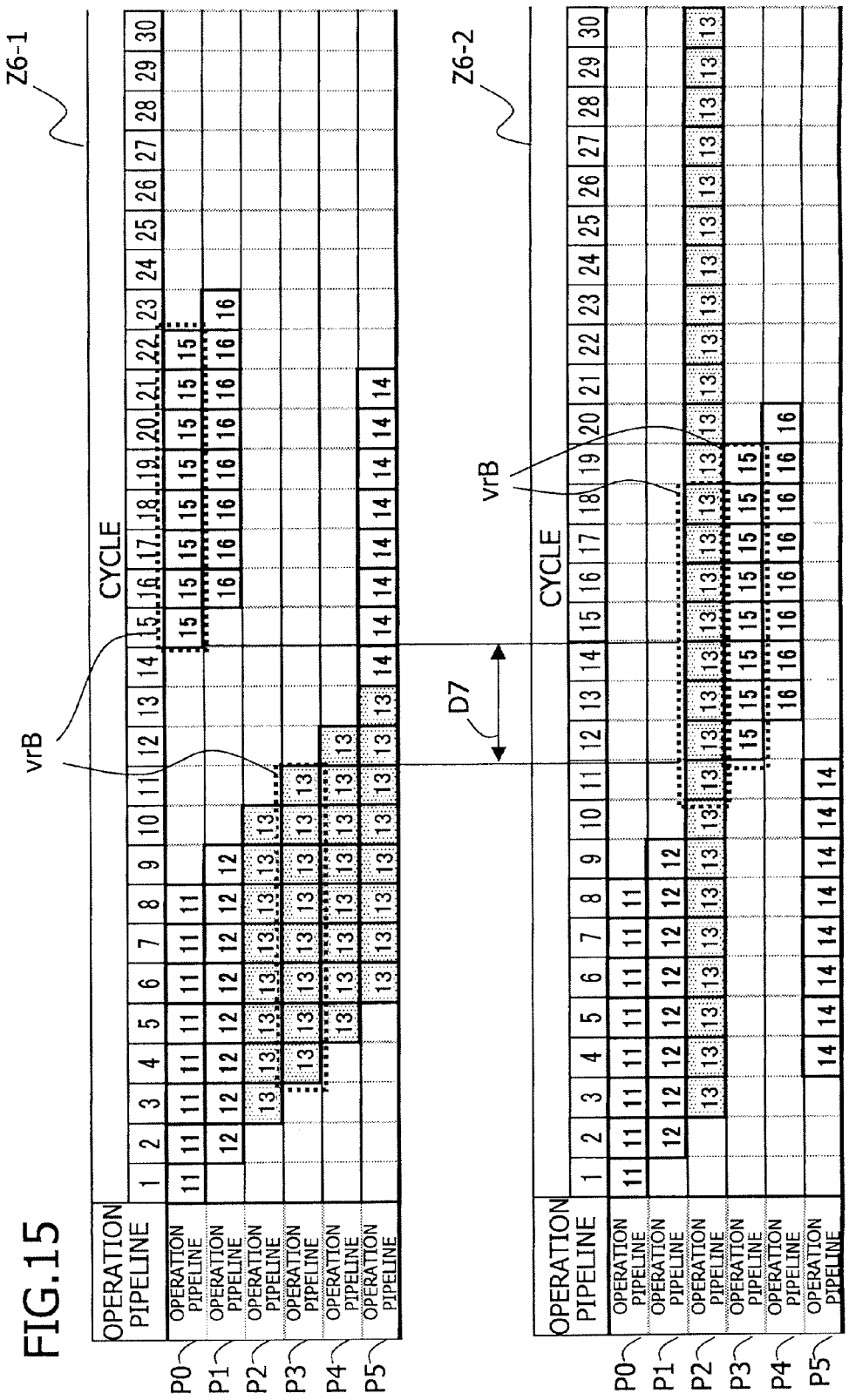
FIG. 15 is an example explaining processing sequences according to whether or not instruction division is performed in a second embodiment.

FIG. 15 is an example explaining processing sequences according to whether or not instruction division is performed in the second embodiment. The processing sequence diagram Z6-1 and the processing sequence diagram Z6-2 are examples of processing sequence diagrams for cases in which instruction division is and is not performed, respectively. In the diagrams, numbers 11 to 16 in the boxes indicate the instructions 11 to 16, and the instructions are processed in order from instruction 11 to instruction 16. Further, the instruction 13 is a full-word instruction, and the other instructions 11, 12 and 14 to 16 are byte instructions. Also, the instruction 14 is a division instruction, and can be processed only by the operation pipeline P5.

In this example, the element data column array size VL for each instruction is 64, and each operation unit has eight 8-bit operators. That is, an operation unit can process 8×8 bits in one cycle. Hence in the case of a byte instruction for which the bit width of element data is 8 bits, eight columns (8/64) of an array can be processed in one cycle, and one instruction is processed in eight cycles. On the other hand, in the case of a full-word instruction with an element data bit width of 32 bits, by using four operation units for processing of one element data unit, two columns (2/64) of an array can be processed in one cycle, and one instruction is processed in 32 cycles.

In this example, among demarcated element data columns resulting by demarcation into four of an element data column with array numbers 1 to 64 of an instruction 13, there is a dependence relation between the demarcated element data column vrB (element data column with array numbers 17 to 32) to be processed second, and the element data column vrB of an instruction 15. Hence processing of instruction 15 is made to wait until the values of the demarcated element data column vrB of the instruction 13 are finalized.

Hence the instruction 13 is divided into four (N) divided instructions, which are respectively processed by the operation pipelines P2 to P5, as in the processing sequence diagram Z6-1. However, because the specific operation pipeline P5 is used for a divided instruction, a subsequent division instruction 14 is made to wait until the specific operation pipeline P5 enters the free state. As a result, operation processing of the instruction 15 which is fetched next after the instruction 14 can be started from the 15th cycle, and compared with the case in which the instruction 13 is not divided (Z6-2), the start cycle is delayed by three cycles D7.

Hence in the vector processor 1 of this embodiment, when a divided instruction occupies the specific operation pipeline P5, and there is an instruction 14 subsequent to the instruction 13 for division which can only be processed by the specific pipeline P5, division of the instruction 13 for division is not performed. As a result, the instruction 13 is processed by a single operation pipeline P2, as in the processing sequence diagram Z6-2, so that the instruction 14 can be processed by the specific operation pipeline P5 from the fourth cycle. Further, at this time the instruction 15 is in a dependence relation with the element data column vrB of the instruction 13, and processing can be started from the 12th cycle. As a result, the start cycle for the instruction 15 is earlier by three cycles D7 (Z6-2) compared with the case in which the instruction 13 is divided (Z6-1), so that processing throughput is improved.

In this way, when the number of divisions of an instruction for division (in this example, the instruction 13) is large, a greater number of operation pipelines are occupied as a result of the instruction division, and so the probability of occupation of a specific operation pipeline increases. As a result, delays to specific instructions tend to occur. Hence in the vector processor of this embodiment, when a plurality of divided instructions resulting from division of element data of an instruction to be issued occupy the specific operation pipeline, if there is a specific instruction subsequent to the instruction to be issued, then by not performing instruction division, processing throughput can be more effectively improved.

Next, an example of changing the order of element data processing in the second embodiment is explained.

[Changing the Order of Processing of Instruction Element Data]

Figure 16:
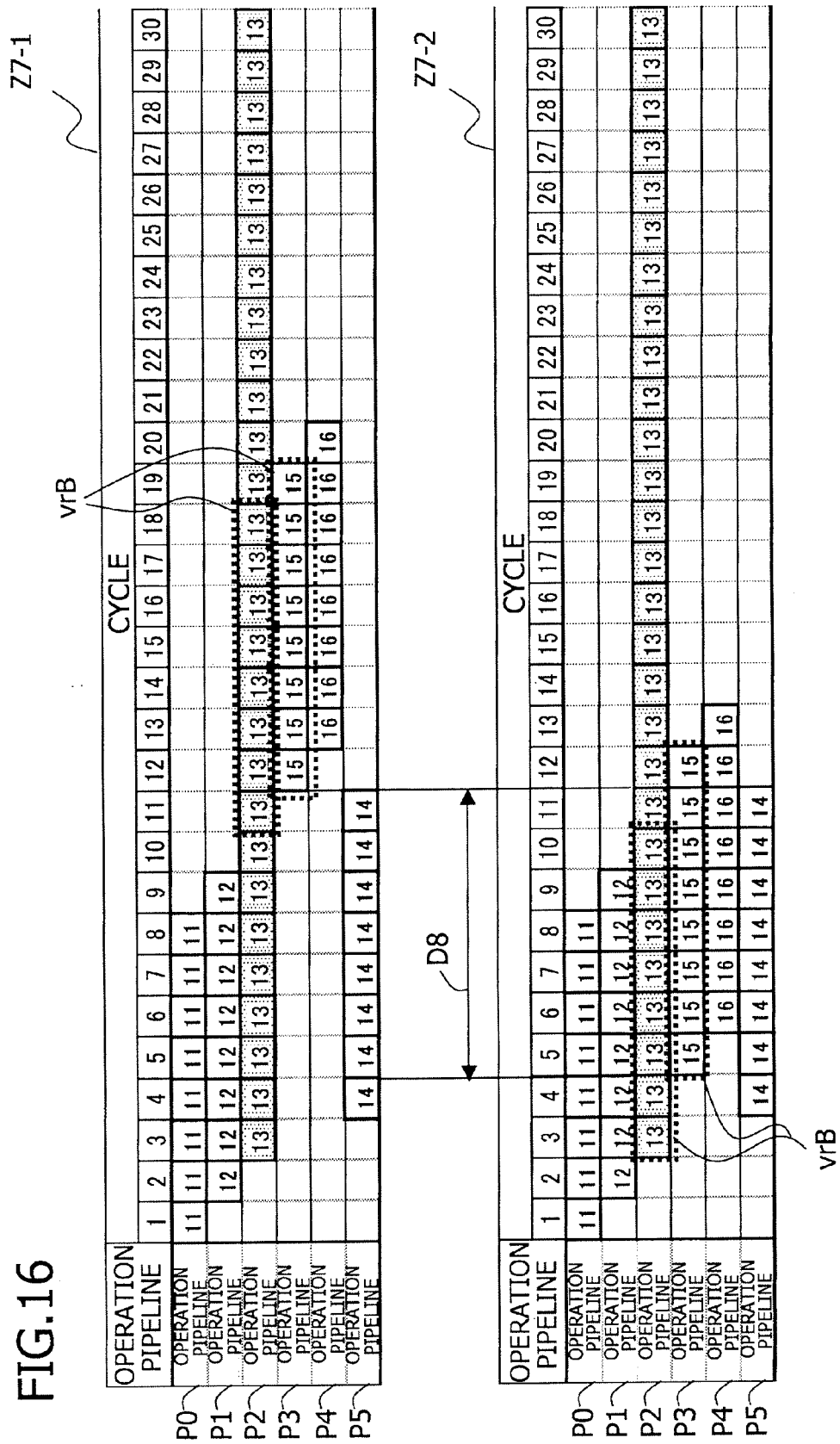
FIG. 16 is an example explaining processing sequences resulting from change in the order of processing of instruction element data columns in the second embodiment.

FIG. 16 is an example explaining processing sequences resulting from change in the order of processing of instruction element data columns in the second embodiment. Z7-1 and Z7-2 are processing sequence diagrams for cases in which the order of processing of the element data column of an instruction 13 is not and is changed, respectively. In the processing sequence diagram Z7-1, the instruction 13 is processed in order from element data columns with smaller array numbers (1-64). Hence processing of the instruction 15 can be started from the 12th cycle.

On the other hand, in the processing sequence diagram Z7-2, of the element data column with array numbers 1 to 64, a portion of the demarcated element data columns, in a dependence relation with the subsequent instruction 15, is preferentially processed. The element data column of the instruction 13 is demarcated into four demarcated element data columns (with array numbers 1 to 16, array numbers 17 to 32, array numbers 33 to 48, and array numbers 49 to 64). In this example, among the demarcated element data columns, the element data column vrB with array numbers 17 to 32 is in a dependence relation with the element data column of the instruction 15, and so in the vector processor in this embodiment, the demarcated element data column vrB with array numbers 17 to 32 is preferentially processed (cycles 3 to 10).

As a result, because the values of the demarcated element data column vrB are finalized in cycles 3 to 10, operation processing of the instruction 15 can be started from the fourth cycle. In this example, in the fifth cycle following the processing start cycle (fourth cycle) of the instruction 14, processing of the instruction 15 is started. As a result, the processing start cycle for the instruction 15 is earlier by seven cycles D8.

In this way, in the vector processor of this embodiment, when an instruction to be issued is not divided because there is a specific instruction, the processing order of the element data columns of an instruction are changed such that, among demarcated element data columns resulting from demarcation of the element data column of an instruction to be issued, a demarcated element data column which is in a dependence relation with a subsequent instruction is preferentially processed. As a result, when the number of processing cycles for an instruction to be issued is large, as in this embodiment, the vector processor changes the processing order, and so can more effectively improve processing throughput.

All examples and conditional language provided herein are intended for the pedagogical purposes of aiding the reader in understanding the embodiments and the concepts contributed by the inventor to further the art, and are not to be construed as limitations to such specifically recited examples and conditions, nor does the organization of such examples in the specification relate to a showing of the superiority and inferiority of the embodiments. Although one or more embodiments of the present invention have been described in detail, it should be understood that the various changes, substitutions, and alterations could be made hereto without departing from the spirit and scope of the invention.

The invention claimed is:

1. A vector processor, comprising:
    an instruction fetching unit configured to acquire an instruction from memory to perform an operation on an element data column;
    a decoding/issuing unit configured to decode the acquired instruction and issuing the decoded instruction in a cycle unit;
    an operation group configured to include a plurality of operation units each processing the issued instruction; and
    a register configured to store the element data column in consecutive addresses, wherein
    the plurality of operation units include a first operation unit which processes a first type instruction and a second operation unit which processes a second type instruction in addition to the first type instruction; and
    when a plurality of divided instructions, for which the element data of an instruction to be issued has been divided, are processed by the second operation unit, in a case where the second type instruction is not present in an instruction subsequent to the instruction to be issued, the decoding/issuing unit issues the divided instructions, and in a case where the second type instruction is present, the decoding/issuing unit issues the instruction to be issued without performing division.

2. The vector processor according to claim 1, wherein
    each of the operation units includes one or a plurality of operators;
    the first and second type instructions further include a first bit-width instruction, each element data item constituting an element data column of which has a first bit width and is processed by M (M≥1) operators each, and a second bit-width instruction, each element data item of which is N (N≥2) times the first bit width and is processed by M×N operators each; and
    when an instruction subsequent to the second bit-width instruction to be issued includes the first bit-width instruction which is in a dependence relation with a second demarcated element data column among first demarcated element data columns and second demarcated element data columns to be processed thereafter, resulting from demarcation into N columns of an element data column of the second bit-width instruction, the plurality of divided instructions are divided as N instructions to process the first and second demarcated element data columns.

3. The vector processor according to claim 2, wherein, when the instruction to be issued is not divided, the decoding/issuing unit changes the order of processing the element decoding column such that the second demarcated element data column of the second bit-width instruction to be issued is preferentially processed, and issues the second bit-width instruction.

4. The vector processor according to claim 1, wherein the instruction subsequent to the instruction to be issued includes, at most, an instruction which is issued before the end of processing of the plurality of divided instructions.

5. The vector processor according to claim 2, wherein the instruction subsequent to the second bit-width instruction to be issued includes, at most, an instruction which is issued before the end of processing of the second bit-width instruction to be issued.

6. A vector processor processing method, comprising:
    acquiring from memory an instruction to perform an operation on an element data column; and
    decoding the acquired instruction and issuing the decoded instruction in a cycle unit, wherein
    the issued instruction is processed by operation units, and among the plurality of operation units a first operation unit processes a first type instruction, a second operation unit processes a second type instruction in addition to the first type instruction, and the element data column is stored in consecutive addresses in a register; and
    in the decoding and issuing, when a plurality of divided instructions resulting from division of element data of the instruction to be issued are processed by the second operation unit, in a case where there is no second type instruction in the instructions subsequent to the instruction to be issued, the divided instructions are issued, and in a case where there is the second type instruction, the instruction to be issued is issued without being divided.

* * * * *